United States Patent
Tsuji et al.

(10) Patent No.: US 11,052,645 B2
(45) Date of Patent: Jul. 6, 2021

(54) THERMOPLASTIC RESIN FILM, ITS MANUFACTURING METHOD, AND LAMINATED BODY

(71) Applicant: KURARAY CO., LTD., Kurashiki (JP)

(72) Inventors: Wataru Tsuji, Tainai (JP); Takao Hoshiba, Tainai (JP); Nariaki Fujii, Tainai (JP); Masaaki Hagiwara, Tainai (JP)

(73) Assignee: KURARAY CO., LTD., Kurashiki (JP)

(*) Notice: Subject to any disclaimer, the term of this patent is extended or adjusted under 35 U.S.C. 154(b) by 181 days.

(21) Appl. No.: 16/077,329

(22) PCT Filed: Feb. 13, 2017

(86) PCT No.: PCT/JP2017/005152
§ 371 (c)(1),
(2) Date: Aug. 10, 2018

(87) PCT Pub. No.: WO2017/141873
PCT Pub. Date: Aug. 24, 2017

(65) Prior Publication Data
US 2019/0055393 A1 Feb. 21, 2019

(30) Foreign Application Priority Data
Feb. 15, 2016 (JP) .............................. JP2016-025751

(51) Int. Cl.
B32B 27/30 (2006.01)
B32B 7/02 (2019.01)
B32B 27/28 (2006.01)
B32B 27/18 (2006.01)
B32B 27/20 (2006.01)

(52) U.S. Cl.
CPC ............ *B32B 27/308* (2013.01); *B32B 7/02* (2013.01); *B32B 27/18* (2013.01); *B32B 27/20* (2013.01); *B32B 27/28* (2013.01); *B32B 27/30* (2013.01)

(58) Field of Classification Search
CPC ......... C08L 33/12; C08J 5/18; C08J 2333/08; C08J 2333/12; C08F 220/10; C08F 220/14; C08F 220/18
USPC ...................................................... 428/195.1
See application file for complete search history.

(56) References Cited

U.S. PATENT DOCUMENTS 5,346,954 A * 9/1994 Wu .................. C08F 265/04
525/54.2
2003/0032722 A1 2/2003 Kitaike et al.
2004/0247909 A1 12/2004 Bartsch et al.
2009/0246483 A1 10/2009 Sugimura 2012/0313058 A1 12/2012 Masuhara et al.
2016/0053062 A1* 2/2016 Maeda ..................... C08L 33/12
428/220
2019/0055393 A1* 2/2019 Tsuji ..................... B29C 48/305

FOREIGN PATENT DOCUMENTS

| JP | 6-73199 A | 3/1994 |
| JP | 10-237261 | 9/1998 |
| JP | 2002-361712 | 12/2002 |
| JP | 2009-143174 A | 7/2009 |
| JP | 2009-196327 A | 9/2009 |
| JP | 2009-202382 A | 9/2009 |
| JP | 2009-262542 A | 11/2009 |
| JP | 2012-12476 A | 1/2012 |
| JP | 2013-23461 A | 2/2013 |
| JP | 2013-112790 A | 6/2013 |
| JP | 2013-194037 A | 9/2013 |
| JP | 2014-062228 A | 4/2014 |
| JP | 2014-88542 A | 5/2014 |
| JP | 2014-88543 A | 5/2014 |
| WO | WO 01/62843 A2 | 8/2001 |
| WO | WO 2011/089794 A1 | 7/2011 |
| WO | WO 2012/124395 A1 | 9/2012 |
| WO | WO-2014167868 A1 * | 10/2014 ............ C08L 33/12 |

OTHER PUBLICATIONS

International Search Report dated May 16, 2017 in PCT/JP2017/005152 filed Feb. 13, 2017.
Extended European Search Report dated Aug. 12, 2019 in Patent Application No. 17753130.8, 10 pages.

(Continued)

*Primary Examiner* — Betelhem Shewareged
(74) *Attorney, Agent, or Firm* — Oblon, McClelland, Maier & Neustadt, L.L.P.

(57) ABSTRACT

Provided is a thermoplastic resin film having at least one of film surfaces being excellent in printability, having sufficiently low internal haze, and exhibiting a favorable matte appearance. A thermoplastic resin film according to the present invention composed of a thermoplastic resin composition (C) including at least one kind of a thermoplastic resin (R) and fine particles (P) having a volume average particle diameter of 0.5 to 15 μm and a refractive index different from that of the thermoplastic resin (R) by 0.02 or more.

At least one of film surfaces satisfies formulas (1) and (2).

$$G_L \geq 60 \qquad (1),$$

$$G_L - 35 \leq G_H \leq G_L - 10 \qquad (2)$$

(In the formulas (1) and (2), $G_L$ is 60° gloss (%) at 20° C., $G_H$ is 60° gloss (%) when the thermoplastic resin film is heated at a temperature 10° C. higher than a glass transition temperature of the thermoplastic resin composition (C) for 30 minutes, then cooled to 20° C.).

17 Claims, 1 Drawing Sheet

(56) References Cited

OTHER PUBLICATIONS

Combined Taiwanese Office Action dated Jun. 3, 2020 in Taiwanese Patent Application No. 106104696 (with English translation), 5 pages.

* cited by examiner

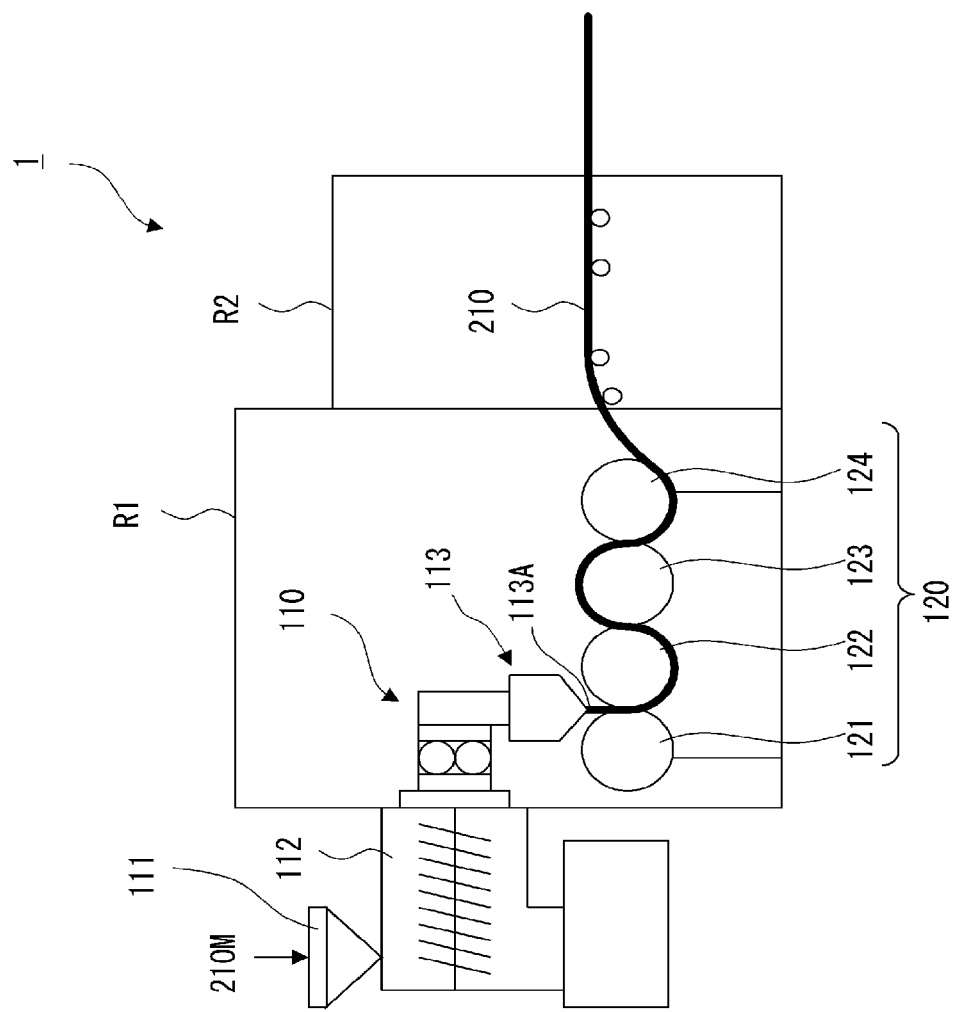

THERMOPLASTIC RESIN FILM, ITS MANUFACTURING METHOD, AND LAMINATED BODY

TECHNICAL FIELD

The present invention relates to a thermoplastic resin film and a method of manufacturing the same. The present invention also relates to a printed resin film, a matte resin film, and a method of manufacturing them, a decorating film, a film for building materials, a laminated film, and a laminated body using the thermoplastic resin film.

BACKGROUND ART

Resin films having a matte surface with no glossiness on the surface (matte resin film) are sometimes used for applications such as interior and exterior parts of automobiles, exterior parts of household electric appliances, exterior parts of furniture, and wall materials. At least one of the film surfaces of the matte resin film may be printed depending on the application of the film in order to provide a design property such as a rich impression and deepness or to provide a decorative property. In such a case, the matte resin film is required to have a favorable matte appearance and favorable printability.

Examples of methods of manufacturing a matte resin film according to related art include a method of molding a resin composition, in which fine particles (matting agent) with a matting effect are dispersed in a transparent resin, into a film shape (Patent Literature 1 to 4, etc.), and a method of molding a resin (composition) not including or including fine particles with a matting effect (matting agent) into a film shape and then pressing an embossing roller having fine recessions and protrusions on its surface onto the resin to provide fine recesses and projections on the surface (Patent Literature 5 and 6, etc.).

In the present specification, the term "resin (composition)" means a resin or a resin composition.

Patent Literature 1 discloses a matte resin film obtained by forming a resin composition including a thermoplastic polymer, a rubber-containing polymer, and a matting agent into a film shape (Claim 1). Examples of the matting agent listed in Patent Literature 1 include resin fine particles having a crosslinked structure with a particle diameter of 1 to 20 μm, mica fine particles, and talc fine particles (Claim 2). Examples of the method of manufacturing a matte resin film listed in Patent Literature 1 include a T-die method, an inflation method, and a calendaring method (paragraph 0028).

Patent Literature 2 discloses a matte resin film obtained by forming a resin composition including a thermoplastic polymer, a rubber-containing polymer, and a matting agent into a film shape as a matte resin film to be printed (Claims 1 and 10). Examples of the matting agent listed in Patent Literature 2 include inorganic particles and/or organic cross-linked particles having an average particle diameter of 0.5 to 20 μm and a hydroxyl group-containing polymer (Claims 2 and 3). Patent Literature 2 describes that the above configuration can provide a matte resin film with a surface matte appearance excellent in a rich impression and deepness and that does not become glossy again (paragraph 0069).

Commonly, regardless of whether the matte resin film includes fine particles, which are a matting agent, the matte resin film tends to have low printability due to recesses and projections on its surface, and thereby easily generate unprinted parts (paragraph 0006 of Patent Literature 3). As described above, in a matte resin film, a matte appearance and printability are properties that contradict each other. When an unprinted part is generated, a desired printing effect (imparting of the design property or decorative property etc.) cannot be achieved, which reduces the manufacturing yield.

Incidentally, in the method of manufacturing a thermoplastic resin film by melt extrusion, after a raw material resin (composition) is melted and extruded from a T-die into a film shape, it is common to sandwich the resin composition between a pair of cooling rollers to solidify it in order to control the thickness of the film and to improve the surface appearance of the film. However, in a matte resin film composed of a resin composition, in which fine particles as a matting agent are dispersed, it is necessary to make the fine particles as the matting agent protrude from the film surface in order to achieve a matte appearance. However, in the method of manufacturing a matte resin film, when a step of extruding a resin composition, in which fine particles as the matting agent are dispersed, into a film shape and sandwiching the resin composition between a pair of cooling rollers is performed, the fine particles could be pushed inside the film, and thus the matte appearance may be impaired. Further, when the step of extruding a resin composition, in which fine particles as the matting agent are dispersed, into a film shape and sandwiching the resin composition between a pair of cooling rollers is not performed, it is difficult to control the thickness of the film, and the thickness of the obtained film tends to be greatly uneven. Further, streaks or the like may be generated on the film surface, and the surface appearance of the film may be impaired.

Patent Literature 3 discloses a matte resin film having a difference between the surface gloss level at 60 degrees of the front surface and that of the rear surface of the film of 5% or more (Claim 1). Patent Literature 3 mentions, as the raw material resin composition, a resin composition including a thermoplastic polymer, a rubber-containing polymer, and a matting agent (Claim 5). Patent Literature 3 mentions, as the matting agent, a hydroxyl group-containing polymer (Claim 6). Patent Literature 3 discloses a method of manufacturing a matte resin film by melting and extruding the resin composition and then sandwiching the melted product between a mirror surface roller and a non-mirror surface roller composed of a rubber roller or an embossed roller (Claims 13 and 14). The manufacturing method described in Patent Literature 3 can effectively prevent the thickness of the film from becoming uneven and streaks from occurring in the film, because the melted product is sandwiched between the pair of the rollers. In the method described in Patent Literature 3, a mirror surface is transferred to the film surface that has been in close contact with the mirror surface roller. Thus, the gloss level of this film surface is high, and when this film surface is printed, there are a small number of unprinted parts (paragraph 0090 of Patent Literature 3). On the other hand, the gloss level of the film surface that has been in close contact with the non-mirror roller is low so as to exhibit a matte appearance (paragraph 0090 of Patent Literature 3).

Patent Literature 4 discloses a method of manufacturing an extruded matte sheet including extruding a molten resin composition, in which fine particles are dispersed, from a die and molding the resin composition while sandwiching it between a pair of cooling rollers, one being a highly rigid metallic roller, and the other being an elastic roller including a thin metal film on its outer periphery (Claim 1). The manufacturing method described in Patent Literature 4 can effectively prevent the thickness of the film from becoming uneven and streaks from occurring in the film, because the melted product is sandwiched between the pair of the cooling rollers (paragraph 0009 of Patent Literature 4). Patent Literature 4 describes that the use of the metallic elastic roller effectively prevents the fine particles as a matting agent from being pushed into a transparent resin, thereby effectively preventing a matte appearance from being impaired (paragraph 0011 of Patent Literature 4). However, the surface of the metallic elastic roller is usually made smooth by mirror finish treatment, which makes it difficult to make the fine particles as the matting agent protrude from the film surface. Therefore, the matte appearance does not sufficiently develop.

Patent Literature 5 and 6 disclose a method of manufacturing a matte resin film including melting and extruding a transparent resin from a T-die and sandwiching a melted product between a first cooling roller composed of a rubber roller or a metallic elastic roller and a second cooling roller composed of a metallic roller with a recessed and projected shape formed on its outer periphery to transfer the recessed and projected shape of the second cooling roller to the melted product (Claim 1 of Patent Literature 5 and Claim 1 of Patent Literature 6). In Patent Literature 5 and 6, a matte appearance of a film surface is achieved by transferring the recessed and projected shape of the second cooling roller to the surface of the melted product without using fine particles as a matting agent.

All of the related art described in Patent Literature 1 to 6 provide recesses and projections on the film surface by some means at the time of manufacturing the film and do not relate to a technique of developing a favorable matte appearance by applying heat treatment to the film that has been cooled and solidified. Commonly, the thermoplastic resin film using fine particles, which are a matting agent, tends to have high internal haze due to the presence of the fine particles. When the internal haze is too high, it becomes difficult to align the film when the film is bonded to a member or the like after the film is printed. Therefore, it is preferable that the internal haze of a thermoplastic resin film using fine particles as a matting agent be sufficiently low. In the present specification, the term "internal haze" indicates haze excluding the influence of recesses and projections on front and rear surfaces, and is measured by a method described later.

CITATION LIST

Patent Literature

Patent Literature 1: Japanese Unexamined Patent Application Publication No. H06-073199 (Japanese Patent No. 3307989)
Patent Literature 2: Japanese Unexamined Patent Application Publication No. H10-237261
Patent Literature 3: Japanese Unexamined Patent Application Publication No. 2002-361712 (Japanese Patent No. 3964234)
Patent Literature 4: Japanese Unexamined Patent Application Publication No. 2009-143174 (Japanese Patent No. 5108487)
Patent Literature 5: Japanese Unexamined Patent Application Publication No. 2009-202382 (Japanese Patent No. 5118506)
Patent Literature 6: Japanese Unexamined Patent Application Publication No. 2009-196327 (Japanese Patent No. 5143587)

SUMMARY OF INVENTION

Technical Problem

The present invention has been made in view of the above circumstances. An object of the present invention is to provide a thermoplastic resin film having at least one of the film surfaces being excellent in printability, having sufficiently low internal haze, and exhibiting a favorable matte appearance, and a method of manufacturing the same.

The thermoplastic resin film according to the present invention can exhibit a favorable matte appearance by applying a heat treatment after the film is manufactured.

Solution to Problem

The present invention provides the following thermoplastic resin film, a method of manufacturing the same, a printed resin film, a matte resin film, and a method of manufacturing the same, a decorating film, a film for building materials, a laminated film, and a laminated body.

A thermoplastic resin film according to the present invention is composed of a thermoplastic resin composition (C) including at least one kind of a thermoplastic resin (R) and fine particles (P) having a volume average particle diameter of 0.5 to 15 μm and a refractive index different from that of the thermoplastic resin (R) by 0.02 or more. At least one of film surfaces satisfies formulas (1) and (2).

$$G_L \geq 60 \tag{1}$$

and $$G_L - 35 \leq G_H \leq G_L - 10 \tag{2}$$

(In the formulas (1) and (2), $G_L$ is 60° gloss (%) at 20° C., and $G_H$ is 60° gloss (%) when the thermoplastic resin film is heated at a temperature 10° C. higher than a glass transition temperature of the thermoplastic resin composition (C) for 30 minutes, then cooled to 20° C.)

The thermoplastic resin film according to the present invention preferably further satisfies a formula (3-1).

$$10/d \leq W \leq 30/d \tag{3-1}$$

(In the formula (3-1), d is a volume average particle diameter (μm) of the fine particles (P), and W is a content (mass %) of the fine particles (P) in the thermoplastic resin film.)

In the thermoplastic resin film according to the present invention, external haze is preferably lower than internal haze.

The thermoplastic resin (R) preferably includes a methacrylic resin.

In the thermoplastic resin film, the thermoplastic resin (R) preferably includes acrylic-based multilayer structure polymer particles (A), in which at least one inner layer is a crosslinked elastic polymer layer with a main component monomer unit being an alkyl acrylate ester monomer unit having an alkyl group carbon number of 1 to 8 and/or a conjugated diene-based monomer unit, and an outermost layer is a thermoplastic polymer layer with a main component monomer unit being a alkyl methacrylate ester monomer unit having an alkyl group carbon number of 1 to 8.

The acrylic-based multilayer structure polymer particles (A) preferably include three-layer structure polymer particles (AX). The three-layer structure polymer particles (AX) preferably include, from its center, first to third layers.

The first layer preferably consists of a crosslinked polymer layer including 30 to 98.99 mass % of methyl methacrylate units, 1 to 70 mass % of alkyl acrylate ester units having an alkyl group carbon number of 1 to 8, and 0.01 to 2 mass % of polyfunctional monomer units.

The second layer preferably consists of a crosslinked elastic polymer layer including 70 to 99.9 mass % of alkyl acrylate ester units having an alkyl group carbon number of 1 to 8, 0 to 30 mass % of methyl methacrylate units (optional component), and 0.1 to 5 mass % of polyfunctional monomer units.

The third layer (outmost layer) preferably consists of a hard thermoplastic polymer layer including 80 to 99 mass % of methyl methacrylate units and 1 to 20 mass % of alkyl acrylate ester units having an alkyl group carbon number of 1 to 8.

The particle diameter of the acrylic-based multilayer structure polymer particles (A) is preferably 0.05 to 0.20 μm.

The thermoplastic resin (R) preferably further includes a methacrylic-based resin (B) having 80 mass % or more of methyl methacrylate units and having an intrinsic viscosity of 0.3 to 1.0 dl/g.

A printed resin film according to the present invention is the above thermoplastic resin film according including at least one printed film surface.

A matte resin film according to the present invention is obtained by applying a heat treatment to the above thermoplastic resin film or the above printed resin film.

A decorating film according to the present invention includes the above thermoplastic resin film, the above printed resin film, or the above matte resin film.

A film for building materials according to the present invention includes the above thermoplastic resin film, the above printed resin film, or the above matte resin film.

A laminated film according to the present invention includes the above thermoplastic resin film, the above printed resin film, or the above matte resin film.

A laminated body according to the present invention includes the above thermoplastic resin film, the above printed resin film, the above matte resin film, or the above laminated film laminated on a substrate.

A method of manufacturing the thermoplastic resin film according to the present invention is a method of manufacturing the above thermoplastic resin film according to the present invention. The method includes: melting and extruding the thermoplastic resin composition (C) from a T-die; and sandwiching a melted product extruded into a film shape between a pair of cooling rollers, which are both metallic rigid rollers or one is a metallic rigid roller and the other is a metallic elastic roller.

The method of manufacturing a thermoplastic resin film according to the present invention, wherein the following formula (4) is preferably satisfied, and in the formula (4), T1 is a surface temperature of one of the cooling rollers, T2 is a surface temperature of the other one of the cooling rollers (where T2≥T1), and TgC is a glass transition temperature of the thermoplastic resin composition (C).

$$10 \le |TgC - T2| \le 40 \quad (4)$$

A method of manufacturing a matte resin film includes applying a heat treatment to the above thermoplastic resin film according to the present invention. Further, the method of manufacturing a matte resin film includes printing at least one film surface of the above thermoplastic resin film according to the present invention, and then applying a heat treatment to the thermoplastic resin film.

When the thickness is 5 to 250 μm, usually the film is classified mostly as "film", and when the thickness exceeds 250 μm, the film is mostly classified as "sheet". However, the present specification does not make such a distinction between the film and sheet, and the film and sheet are collectively referred to as a "film"

In the present specification, unless otherwise specified, the refractive index of the thermoplastic resin (R) is measured by the following method.

The thermoplastic resin (R) is processed into a sheet having a length of 3 cm, a width of 3 cm, and a thickness of 3 mm by press molding, and the refractive index is measured at 23° C. (degrees Celsius) and at a measurement wavelength of 587.6 nm (d-line) using "Kalnew Precision Refractometer KPR-200" manufactured by Shimadzu Device Corporation.

In the present specification, unless otherwise specified, the refractive index of the fine particles (P) is measured by a liquid immersion method (Becke line method) using a microscope.

In the present specification, unless otherwise specified, the volume average particle diameter of the fine particles (P) is a value measured by the following method.

The volume average particle diameter of the fine particles (P) is measured by a laser diffraction/scattering method using a Microtrac particle diameter distribution measuring device ("MK-3300" manufactured by Nikkiso Co., Ltd.).

In the present specification, unless otherwise specified, the total haze, internal haze, and external haze of the film are measured by the following method.

The total haze of the film to be measured is measured in accordance with JIS K 7136 (haze measurement as usual). Two transparent resin films for measurement assistance having a thickness about the same and haze of 0.2 or less are prepared. After both sides of the film to be measured are wet with drops of water, films for measurement assistance are brought into close contact with the respective surfaces. This eliminates the influence of the recesses and projections on the surface of the film to be measured. In this state, haze measurement is carried out in accordance with JIS K 7136, and the obtained value is defined as the internal haze. A difference between the above total haze and the above internal haze is calculated as the external haze.

The total haze of the film is preferably 10 to 20%, more preferably 13 to 16%. The internal haze is preferably 6 to 13%, more preferably 8 to 10%, and further more preferably 8 to 9%. The external haze is preferably 2 to 8%, and more preferably 3 to 7%.

In the present specification, unless otherwise specified, the "glass transition temperature (Tg) of a resin (composition)" is measured by the following method.

The glass transition temperature (Tg) of the resin (composition) is measured in accordance with JIS K 7121. Using a differential scanning calorimeter ("DSC-50" manufactured by Shimadzu Corporation), the temperature of the sample is raised to 230° C. and cooled to room temperature, then a DSC curve is measured under the condition that the temperature is raised again from the room temperature to 230° C. at a heating rate of 10° C./min. An intermediate point calculated from the obtained DSC curve is defined as the glass transition temperature (Tg).

When a plurality of intermediate points appear in the range from room temperature to 230° C., the intermediate point derived from the resin having the highest content among the intermediate points is defined as the glass transition temperature (Tg).

In the present specification, unless otherwise specified, the "gloss level" of the thermoplastic resin film is 60° gloss and is measured by the following method.

As the gloss meter, "VG7000" manufactured by Nippon Denshoku Industries Co., Ltd. is used. First, in the thermoplastic resin film, the gloss is measured on both film surfaces in accordance with the gloss measurement of JIS Z 8741 at 20° C. under 60° reflection condition. The measured value is $G_L$.

Further, the film is heated at a temperature 10° C. higher than Tg for 30 minutes and allowed to cool naturally to 20° C., and the gloss is measured again on both film surfaces in the same manner as above. The measured value is $G_H$.

In the present specification, unless otherwise specified, the particle diameter of the acrylic-based multilayer structure polymer particles (A) in the latex including the acrylic-based multilayer structure polymer particles (A) is measured by "LA-300" manufactured by Horiba, Ltd.

In the course of film manufacturing, the non-crosslinked outermost layer and the like of the acrylic-based multilayer structure polymer particles (A) may melt and form a matrix. In this case, the particle diameter of the acrylic-based multilayer structure polymer particles (A) in the film is smaller than the particle diameter of the raw material polymer particles.

In the present specification, unless otherwise specified, the particle diameter of the acrylic-based multilayer structure polymer particles (A) in the film is determined by observing the cross section by a transmission electron microscope (TEM). Specifically, a part of the film is cut out, cut in a thickness direction with a microtome under freezing conditions, the obtained part is dyed with an aqueous solution of ruthenium oxide, and a cross section of the dyed rubber particle is observed with a TEM. The average diameter of 100 particles is defined as the particle diameter of the acrylic-based multilayer structure polymer particles (A).

Advantageous Effects of Invention

The present invention can provide a thermoplastic resin film having at least one of the film surfaces being excellent in printability, having sufficiently low internal haze, and exhibiting a favorable matte appearance, and a method of manufacturing the same.

Note that the thermoplastic resin film according to the present invention can exhibit a favorable matte appearance by a heat treatment after the film is manufactured.

BRIEF DESCRIPTION OF DRAWINGS

FIG. 1 is a schematic diagram showing a film manufacturing apparatus according to an embodiment of the present invention.

DESCRIPTION OF EMBODIMENTS

"Thermoplastic Resin Film"

A thermoplastic resin film according to the present invention is made to exhibit a favorable matte appearance by a heat treatment after the film is manufactured.

The thermoplastic resin film according to the present invention may be an unstretched film or a stretched film. Unless otherwise specified, a film means an unstretched film.

Hereinafter, the term "thermoplastic resin film" may be abbreviated as a "resin film" or a "film" in some cases.

The thermoplastic resin film according to the present invention includes a thermoplastic resin (R) and fine particles (P) commonly referred to as a matting agent or a light diffusing agent. The thermoplastic resin (R) can be used as a main component of the thermoplastic resin composition (C) constituting the thermoplastic resin film according to the present invention. The thermoplastic resin (R) constitutes preferably 50 mass % or more, more preferably 80 mass % or more, and particularly preferably 90 mass % or more of the thermoplastic resin film.

Commonly, in a thermoplastic resin film including fine particles (P), which are a matting agent, it is necessary to make the fine particles (P), which are the matting agent, protrude from the film surface in order to achieve a matte appearance. Doing so, however, may deteriorate the printability.

In the present invention, it is unnecessary for the film to have a favorable matte appearance during the manufacturing of the film, and it is unnecessary for the fine particles (P), which are the matting agent, to protrude from the film surface. In the present invention, after the film is manufactured, the film is softened by applying a heat treatment to make the fine particles (P), which are the matting agent, protrude from the film surface, thereby achieving a favorable matte appearance.

Note that commonly, it is not clear as to which surface is the front and which surface is the rear of the film. Therefore, in the present specification, the "film surface" is the front surface or the rear surface of the film.

In the present invention, the fine particles (P) have a volume average particle diameter of 0.5 to 15 μm, and a refractive index different from that of the thermoplastic resin (R) by 0.02 or more, preferably 0.03 or more, and more preferably 0.04 or more. When the volume average particle diameter of the fine particles (P) is less than 0.5 μm, a favorable light diffusing effect by the fine particles (P) cannot be achieved after the thermoplastic resin film is heat-treated, making it difficult to exhibit a favorable matte appearance. When the volume average particle diameter of the fine particles (P) exceeds 15 μm, the internal haze of the thermoplastic resin film becomes large, and thus it may become difficult to align the film when the printed film is bonded to, for example, a member. Further, a defect may occur in the appearance when aggregates of fine particles (P) are generated. When the difference between of the refractive indexes and that of the thermoplastic resin (R) and the fine particles (P) is less than 0.02, the light diffusing effect by the fine particles (P) cannot be sufficiently achieved after the heat treatment, making it difficult to exhibit a favorable matte appearance. When the fine particles (P) having a volume average particle diameter of 0.5 to 15 μm and the refractive index different from that of the thermoplastic resin (R) by 0.02 or more are used, a favorable light diffusing effect by the fine particles (P) can be achieved, thereby achieving a favorable matte appearance. The volume average particle diameter of the fine particles (P) is preferably 0.5 to 10 μm, more preferably 3 to 7 μm, and the difference between the refractive index of the thermoplastic resin (R) and that of the fine particles (P) is preferably 0.03 or more.

In the present invention, the aspect ratio of the fine particles (P) is preferably 5 or more, more preferably 10 or more, and particularly preferably 20 or more. When the fine particles (P) having such an aspect ratio are used, a favorable light diffusing effect by the fine particles (P) can be achieved after the heat treatment, thereby achieving a favorable matte appearance. The upper limit of the aspect ratio is not particularly limited, and is usually about 200.

The "aspect ratio" in one fine particle is an index representing a shape of a fine particle defined by (longest major diameter/thickness).

Usually, the fine particles (P) are composed of a plurality of fine particles in which an aspect ratio has a distribution.

In the present specification, unless otherwise specified, the aspect ratio is a value obtained by a measurement as follows. Using an electron microscope, 100 or more fine particles are observed, the aspect ratios of individual fine particles in an obtained microscope image are calculated, and a distribution showing a relationship between the number of fine particles (vertical axis) and the aspect ratio (horizontal axis) is obtained. In this distribution, a range of the aspect ratio that covers 50% of all the fine particles with the aspect ratio, at which the number of the fine particles reaches its peak, as a center is calculated as data of the aspect ratio.

Catalog values may be used for the aspect ratio data.

At least one of the film surfaces of the thermoplastic resin film according to the present invention satisfies the following formulas (1) and (2).

$$G_L \geq 60 \qquad (1),$$

$$G_L - 35 \leq G_H \leq G_L - 10 \qquad (2)$$

(In the above formulas (1) and (2), $G_L$ is 60° gloss (%) at 20° C., and $G_H$ is 60° gloss (%) when the film is heated at a temperature 10° C. higher than a glass transition temperature (Tg) of the thermoplastic resin composition (C) for 30 minutes and then cooled to 20° C.)

$G_L$ is an index of a gloss property at an ordinary temperature (before the heat treatment). On the other hand, $G_H$ is an index of the gloss property and the matte property the after heat treatment.

In the present specification, unless otherwise specified, a "heat treatment for $G_H$ measurement" shall be carried out using an oven ("Safety Fine Oven DF411S" manufactured by Yamato Scientific Co., Ltd.).

When the film surface satisfies the above formula (1) ($G_L$ of the film surface is 60% or more), the film surface has high gloss at an ordinary temperature, and the surface is highly smooth, thereby effectively preventing unprinted parts from being generated and achieving favorable printability. When the $G_L$ of the film surface is less than 60%, the film surface has low gloss at an ordinary temperature, and the fine particles (P) are likely to protrude from the film surface, and thus favorable printability may not be achieved. When the $G_L$ of the film surface is too high, the number of the fine particles (P) that protrude from the film surface after the heat treatment becomes insufficient, and thus a favorable matte appearance may not be achieved. Since at least one of the film surfaces has high gloss at an ordinary temperature, favorable printability, and a favorable matte appearance after the heat treatment, the $G_L$ of at least one of the film surfaces is preferably 60 to 99%, more preferably 70 to 99%, further more preferably 80 to 99%, particularly preferably 90 to 99%.

When the $G_L$ values of the pair of film surfaces differ from each other, it is preferable to print the surface with a higher $G_L$ value, because the quality of the printing can be higher on the surface with a higher $G_L$ value.

When a reduction in the 60° gloss after heating the film at the temperature 10° C. higher than the glass transition temperature (Tg) of the thermoplastic resin composition (C) for 30 minutes is less than 10% ($G_L - G_H < 10$), it is difficult for the film to exhibit a favorable matte appearance after the heat treatment. On the other hand, when the reduction of the 60° gloss after heating the film at the temperature 10° C. higher than the glass transition temperature (Tg) of the thermoplastic resin composition (C) for 30 minutes exceeds 35% ($G_L - G_H > 35$), a matte appearance appears after the heat treatment. However, in such a case, the number of fine particles (P) protruding from the film surface is large, possibly deteriorating the surface appearance. When the film surface satisfies the above formula (2) ($10 \leq G_L - G_H \leq 35$), a favorable matte appearance and a favorable surface appearance can be achieved after the heat treatment.

When the fine particles (P) having a volume average particle diameter of 0.5 to 15 µm, preferably 0.5 to 10 µm, and a refractive index different from that of the thermoplastic resin (R) by 0.02 or more are used and at least one of the film surfaces satisfies the above formulas (1) and (2), it is possible to provide a thermoplastic resin film in which at least one of the film surfaces has high gloss, excellent printability, and sufficiently small internal haze, and that can exhibit a favorable matte appearance after the heat treatment.

In the present invention, the volume average particle diameter d (µm) of the fine particles (P) and a content W (mass %) of the fine particles (P) in the thermoplastic resin film satisfy preferably the formula (3-1), more preferably the formula (3-2), and further more preferably the formula (3-3).

$$10/d \leq W \leq 30/d \qquad (3\text{-}1),$$

$$10/d \leq W \leq 20/d \qquad (3\text{-}2), \text{ and}$$

$$13/d \leq W \leq 17/d \qquad (3\text{-}3).$$

When the content W of the fine particles (P) is too small (less than 10/d), a favorable light diffusing effect by the fine particles (P) cannot be achieved after the heat treatment of the thermoplastic resin film, and thus it may become difficult to exhibit a sufficient matte appearance. When the content W of the fine particles (P) is too high (more than 30/d), the number of the fine particles (P) protruding from the film surface is large when the thermoplastic resin film is manufactured. Thus, the gloss of the film surface may become insufficient, and the printability may also become sufficient. Further, the internal haze may increase. When the content W of the fine particles (P) satisfies preferably formula (3-1), more preferably formula (3-2), further preferably formula (3-3), it is possible to more stably provide a thermoplastic resin film in which at least one of the film surfaces has high gloss, excellent printability, and sufficiently small internal haze, and that can exhibit a favorable matte appearance after the heat treatment.

(Thermoplastic Resin (R))

The thermoplastic resin (R) is not particularly limited, and a melt-processable transparent resin is preferable. The thermoplastic resin (R) may be a general-purpose resin or so-called engineering plastic. The thermoplastic resin (R) may be a non-rubbery polymer or a rubbery polymer. The compounds can be used alone or in combination of two or more as the thermoplastic resin (R).

Examples of the non-rubbery polymer used as the thermoplastic resin (R) include olefin-based resins such as polyethylene, polypropylene, polybutene-1, poly-4-methylpentene-1, and polynorbonene; methacrylic-based resins such as methyl methacrylate resins and methyl methacrylate-styrene resins; styrene-based resins such as polystyrene, styrene-maleic anhydride copolymers, high impact polystyrene, acrylonitrile-styrene (AS)-based resins, acrylonitrile-butadiene-styrene (ABS)-based resins, acrylonitrile.ethylene-propylene-diene styrene (AES)-based resins, acrylic-acrylonitrile-styrene (AAS)-based resins, acrylonitrile-chlorinated ethylene-styrene (ACS)-based resins, and methacrylic butadiene styrene (MBS) resins; ester-based resins such as polyethylene terephthalate and polybutylene terephthalate; amide-based resins such as nylon 6 and nylon 66; polyvinyl chloride, polyvinylidene chloride, polyvinylidene fluoride, polyvinyl alcohol, ethylene-vinyl acetate-based resin, cellulose acetate-based resins, acryl-chlorinated ethylene-based resins, acetal-based resins, fluorine-based resins, aromatic carbonate-based resins, sulfone-based resins, ether sulfone-based resin, methylpentene-based resins, arylate-based resins, resins containing alicyclic structure-containing ethylenically unsaturated monomer units, phenylene sulfide-based resins, phenylene oxide-based resins, ether ether ketone-based resins, ethylene-ethyl acrylate-based resins, chlorinated ethylene-based resins, urethane-based resins, modified polyphenylene ethers, and silicone modified resins.

Examples of the rubbery polymer used as the thermoplastic resin (R) include styrene-based thermoplastic elastomers such as SEPS, SEBS, and SIS; olefin-based rubbers such as IR, EPR and EPDM; acrylic-based thermoplastic elastomers; vinyl chloride-based thermoplastic elastomers; urethane-based thermoplastic elastomers; ester-based thermoplastic elastomers; amide-based thermoplastic elastomers; ionomer-based resins; styrene-butadiene block copolymer; ethylene-propylene rubber; butadiene-based resins; acrylic-based rubber; silicone rubber; and acrylic-based multilayer structure polymer.

The thermoplastic resin (R) preferably includes at least one kind of rubbery polymer, because it is possible to achieve a film that has sufficient flexural strength and can be easily wound up around a roller in continuous production by roll-to-roll processing. Further, the use of the rubbery polymer improves the impact resistance of the thermoplastic resin film.

As the rubbery polymer, among the above examples, multilayer structured particles (so-called core/shell structure rubber particles) including at least one rubber layer and a block copolymer are preferable. Among them, an acrylic-based multilayer structure polymer is particularly preferable in terms of impact resistance and the like.

<Acrylic-Based Multilayer Structure Polymer>

Known acrylic-based multilayer structure polymers can be used as the acrylic-based multilayer structure polymer. In terms of impact resistance and the like, the acrylic-based multilayer structure polymer is preferably acrylic-based multilayer structure polymer particles (A), in which at least one inner layer (a layer inside an outermost layer) is a crosslinked elastic polymer layer with a main component monomer unit being an alkyl acrylate ester monomer unit having an alkyl group carbon number of 1 to 8 and/or a conjugated diene-based monomer unit, and the outermost layer is a thermoplastic polymer layer with a main component monomer unit being a methacrylic acid alkyl ester monomer unit having an alkyl group carbon number of 1 to 8. In the present specification, unless otherwise specified, the "main component monomer unit" is defined as a monomer unit of 50 mass % or more.

The acrylic-based multilayer structure polymer particle (A) is a so-called core/shell structure rubber particle, in which one or a plurality of inner layers including at least one crosslinked elastic polymer layer are covered with the outermost thermoplastic polymer layer.

The acrylic-based multilayer structure polymer particles (A) are preferably graft copolymers, in which the molecular chains of the crosslinked elastic polymer layer constituting at least one inner layer other than the outermost layer are covalently bonded to the molecular chains of the adjacent layer.

Examples of the alkyl acrylate ester having an alkyl group carbon number of 1 to 8 used for the crosslinked elastic polymer layer include methyl acrylate, ethyl acrylate, butyl acrylate, 2-ethylhexyl acrylate, and propyl acrylate. In terms of impact resistance, n-butyl acrylate is preferable. Examples of the conjugated diene-based monomer used for the crosslinked elastic polymer layer include 1,3-butadiene and isoprene.

As the crosslinked elastic polymer layer, in addition to the alkyl acrylate ester having an alkyl group carbon number of 1 to 8 and/or conjugated diene-based monomer, a vinyl-based monomer copolymerizable with them may be used. Examples of the copolymerizable vinyl-based monomer include a methacrylate ester such as methyl methacrylate, ethyl methacrylate, butyl methacrylate, and cyclohexyl methacrylate; aromatic vinyl compounds such as styrene, p-methyl styrene, and α-methyl styrene; maleimide-based compounds such as N-propyl maleimide, N-cyclohexyl maleimide, and N-o-chlorophenyl maleimide; polyfunctional monomers such as ethylene glycol dimethacrylate, propylene glycol dimethacrylate, triethylene glycol dimethacrylate, hexanediol dimethacrylate, ethylene glycol diacrylate, propylene glycol diacrylate, triethylene glycol diacrylate, allyl methacrylate, and triallyl isocyanurate.

In the present specification, the "polyfunctional monomer" is a monomer having two or more polymerizable functional groups.

In terms of impact resistance and the like of the thermoplastic resin film according to the present invention, the content of the alkyl acrylate ester unit having an alkyl group carbon number of 1 to 8 and/or the conjugated diene-based monomer unit in the crosslinked elastic polymer layer is preferably 60 mass % or more, more preferably 70 mass % or more, further preferably 80 mass % or more, particularly preferably 90 mass % or more.

Examples of the alkyl methacrylate ester having an alkyl group carbon number of 1 to 8 used for the outermost thermoplastic polymer layer in the acrylic-based multilayer structure polymer particles (A) include methyl methacrylate, ethyl methacrylate, propyl methacrylate, butyl methacrylate, cyclohexyl methacrylate. In terms of dispersibility of the acrylic-based multilayer structure polymer particles (A), the content of the methacrylic acid alkyl ester monomer unit in the thermoplastic polymer layer is preferably 70 mass % or more, and more preferably 80 mass % or more.

The number of layers of the acrylic-based multilayer structure polymer particles (A) is not particularly limited and is two, three, or four or more. In terms of thermal stability and productivity, it is particularly preferable that the acrylic-based multilayer structure polymer particles (A) have a three-layer structure.

As the acrylic-based multilayer structure polymer particles (A), it is preferable to use three-layer structure polymer particles (AX). The three-layer structure polymer particles (AX) preferably include, from its center, first to third layers. The first layer preferably consists of a crosslinked polymer layer including 30 to 98.99 mass % of methyl methacrylate units, 1 to 70 mass % of alkyl acrylate ester units having carbon number of 1 to 8, and 0.01 to 2 mass % of polyfunctional monomer units. The second layer preferably consists of a crosslinked elastic polymer layer including 70 to 99.9 mass % of alkyl acrylate ester units having an alkyl group carbon number of 1 to 8, 0 to 30 mass % of methyl methacrylate units (optional component), and 0.1 to 5 mass % of polyfunctional monomer units. The third layer (outmost layer) preferably consists of a hard thermoplastic polymer layer including 80 to 99 mass % of methyl methacrylate units and 1 to 20 mass % of alkyl acrylate ester units having an alkyl group carbon number of 1 to 8.

The ratio of the respective layers in the three-layer structured polymer particles (AX) is not particularly limited. Preferably, the ratio of the respective layers is: the first layer is 5 to 40 mass %, the second layer is 20 to 55 mass %, the third layer (outermost layer) is 40 to 75 mass %.

The particle diameter of the acrylic-based multilayer structure polymer particles (A) is not particularly limited, but it is preferably within the range of 0.05 to 0.20 μm, more preferably within the range of 0.07 to 0.15 μm, and particularly preferably within the range of 0.08 to 0.10 μm. When the particle diameter of the acrylic-based multilayer structure polymer particles (A) is less than 0.05 μm, the handleability of the acrylic-based multilayer structure polymer particles (A) tends to decrease. When the particle diameter of the acrylic-based multilayer structure polymer particles (A) exceeds 0.20 μm, the thermoplastic resin film according to the present invention tends to be whitened when stress is applied thereto, and the transmittance tends to decrease (stress whitening tends to increase). In terms of stress whitening, the particle diameter of the acrylic-based multilayer structure polymer particles (A) is preferably 0.15 μm or less.

The polymerization method of the acrylic-based multilayer structure polymer particles (A) is not particularly limited, and an emulsion polymerization method is preferable. First, one kind or two or more kinds of raw material monomers are subjected to emulsion polymerization to obtain core particles, and then one kind or two or more kinds of other monomers are subjected to emulsion polymerization in the presence of core particles to form shells around the core particles. Then, if necessary, one kind or two or more kinds of monomers are subjected to emulsion polymerization in the presence of particles composed of cores and shells to form other shells. Repeating such a polymerization reaction can manufacture the intended acrylic-based multilayer structure polymer particles (A) as emulsified latex. In the obtained latex, usually a linear methacrylic resin including methyl methacrylate units is present in addition to the acrylic-based multilayer structure polymer particles (A).

The emulsifier used for the emulsion polymerization is not particularly limited, and examples thereof include an anionic-based emulsifier, a nonionic-based emulsifier, and a nonion/anionic-based emulsifier. These emulsifiers can be used alone or in combination of two or more.

Examples of the anionic-based emulsifier include dialkyl sulfosuccinates such as sodium dioctyl sulfosuccinate and sodium dilauryl sulfosuccinate; alkyl benzene sulfonates such as sodium dodecyl benzene sulfonate; and alkyl sulfates such as sodium dodecyl sulfate.

Examples of the nonionic-based emulsifiers include polyoxyethylene alkyl ethers and polyoxyethylene nonyl phenyl ethers.

Examples of the nonionic/anionic-based emulsifier include polyoxyethylene nonylphenyl ether sulfate such as sodium polyoxyethylene nonylphenyl ether sulfate; polyoxyethylene alkyl ether sulfate such as sodium polyoxyethylene alkyl ether sulfate; and alkyl ether carboxylate salts such as sodium polyoxyethylene tridecyl ether acetate.

The number of moles of oxyethylene units added in the above-listed compounds of the nonionic-based emulsifier or the nonionic/anionic-based emulsifier is generally 30 or less, preferably 20 or less, particularly preferably 10 or less in order to prevent the foaming property of the emulsifier from becoming extremely large.

The polymerization initiator used in the emulsion polymerization is not particularly limited, and examples thereof include persulfate-based initiators such as potassium persulfate and ammonium persulfate; redox-based initiators such as persulfoxylate/organic peroxide and persulfate/sulfite.

A chain transfer agent can be used as necessary for the emulsion polymerization. Examples of the chain transfer agent include alkyl mercaptans such as n-octyl mercaptan, n-dodecyl mercaptan, n-lauryl mercaptan, tert-dodecyl mercaptan, and sec-butyl mercaptan.

Upon the emulsion polymerization of each layer, the addition of raw materials such as monomers, emulsifiers, polymerization initiators, chain transfer agents to the polymerization reaction system can be carried out by any known addition method such as a batch addition method, a separate addition method, and a continuous addition method.

The polymerization reaction temperature of each layer is preferably 30 to 120° C., and more preferably 50 to 100° C. The polymerization reaction time of each layer varies depending on the kind and amount of the polymerization initiator and emulsifier to be used and the polymerization temperature, but is usually 0.5 to 7 hours for each layer. The mass ratio (monomer/water ratio) of the monomer to water is preferably 1/20 to 1/1.

The acrylic-based multilayer structure polymer particles (A) included in the polymer latex obtained by the emulsion polymerization are granular. The particle diameter of the acrylic-based multilayer structure polymer particles (A) is preferably 0.05 to 0.2 μm. Latex containing the acrylic-based multilayer structure polymer particles (A) can be used to manufacture the thermoplastic resin film according to the present invention.

The polymer latex manufactured by the emulsion polymerization can be, if necessary, solidified, dehydrated, dried and the like by a known method to recover, for example, powdered polymer in order to obtain the acrylic-based multilayer structure polymer particles (A). Examples of the methods of the separating and recovering, for example, the powdered acrylic-based multilayer structure polymer particles (A) include a salting out coagulation method, a freeze coagulation method, and a spray drying method. Among them, the salting out coagulation method and freeze coagulation method are preferable, because these methods can easily remove impurities from the latex by washing it with water. It is preferable to carry out a step of filtering using a wire mesh or the like having an aperture of 50 μm or less before the solidification step in order to remove foreign matters mixed in the latex.

In the thermoplastic resin composition (C) used in the present invention, the content of the acrylic-based multilayer structure polymer particles (A) is preferably 40 to 80 mass %, more preferably 50 to 70 mass %, and particularly preferably 62 to 67 mass %.

Note that the content of the acrylic-based multilayer structure polymer particles (A) is calculated by the following method using acetone.

After the thermoplastic resin composition (C) is sufficiently dried to remove moisture, a mass thereof (W1) is measured. Next, this thermoplastic resin composition (C) is placed in a test tube, acetone is added and dissolved, and an acetone-soluble fraction is removed. After that, the acetone is removed using a vacuum heat dryer to obtain a residue. The fine particles are separated from this residue, and then a mass of the obtained residue (W2) is measured. The content of the acrylic-based multilayer structure polymer particles (A) is calculated based on the following formula.

[Content of acrylic-based multilayer structure polymer particles $(A)$]=$(W2/W1) \times 100 (\%)$ <Methacrylic-Based Resin (B)>

The thermoplastic resin (R) preferably includes, in addition to the acrylic-based multilayer structure polymer particles (A), a methacrylic-based resin (B) having 80 mass % or more of methyl methacrylate units and having an intrinsic viscosity of 0.3 to 1.0 dl/g. In terms of heat resistance, the content of the methyl methacrylate units in the methacrylic-based resin (B) is more preferably 85 mass % or more, and particularly preferably 90 mass % or more. The methacrylic-based resin (B) can be used alone or in combination of two or more kinds.

The methacrylic-based resin (B) has high transparency. By using such a methacrylic-based resin (B), the difference between the refractive index of the thermoplastic resin (R) and that of the fine particles (P) can be easily adjusted, which is preferable.

The methacrylic-based resin (B) may include, based on the methyl methacrylate unit, 20 mass % or less of copolymerizable vinyl-based monomer units, as necessary. The vinyl-based monomer is not particularly limited, and examples thereof include acrylate ester monomers such as methyl acrylate, ethyl acrylate, butyl acrylate, propyl acrylate, hexyl acrylate, cyclohexyl acrylate, 2-ethylhexyl acrylate, phenyl acrylate, and benzyl acrylate; methacrylate esters such as ethyl methacrylate, butyl methacrylate, propyl methacrylate, hexyl methacrylate, cyclohexyl methacrylate, phenyl methacrylate, and benzyl methacrylate; aromatic vinyl compounds such as vinyl acetate, styrene, p-methylstyrene, o-methylstyrene, m-methylstyrene, α-methylstyrene, and vinylnaphthalene; nitriles such as acrylonitrile and methacrylonitrile; α,β-unsaturated carboxylic acid such as acrylic acid, methacrylic acid, and crotonic acid; and maleimide compounds such as N-ethyl maleimide and N-cyclohexyl maleimide. These compounds can be used alone or in combination of two or more.

The intrinsic viscosity of the methacrylic-based resin (B) is 0.3 to 1.0 dl/g. When the intrinsic viscosity of the methacrylic-based resin (B) is less than 0.3 dl/g, the viscosity of the methacrylic-based resin (B) when the thermoplastic resin composition (C) including the thermoplastic resin (R) and the fine particles (P) are melted and molded decreases, which is not preferable. When the intrinsic viscosity of the methacrylic-based resin (B) exceeds 1.0 dl/g, the fluidity at the time of melting and molding the thermoplastic resin composition (C) decreases, which is not preferable.

The amount of the methacrylic-based resin (B) to be blended based on 100 parts by mass of the acrylic-based multilayer structure polymer particles (A) is not particularly limited and is preferably 1 to 100 parts by mass, more preferably 5 to 70 parts by mass, particularly preferably 15 to 45 parts by mass, and most preferably 20 to 30 parts by mass. When the amount of the methacrylic-based resin (B) to be blended exceeds 100 parts by mass, the stress whitening of the thermoplastic resin film according to the present invention tends to increase and the thermoplastic resin film tends to be hard, which is not preferable. On the other hand, when the amount of the methacrylic-based resin (B) to be blended is 1 parts by mass or more, the processability for forming the thermoplastic resin film is stabilized, which is preferable.

A commercially available product or a standard product of ISO 8257-1 can be used as the methacrylic-based resin (B).

The methacrylic-based resin (B) can be polymerized by a known method. The polymerization method of the methacrylic-based resin (B) is not particularly limited, and examples thereof include an emulsion polymerization method, a suspension polymerization method, a bulk polymerization method, a solution polymerization method.

(Fine Particles (P))

The fine particles (P) dispersed in the thermoplastic resin film according to the present invention are fine particles generally referred to as a matting agent or a light diffusing agent. The fine particles (P) may be inorganic particles or organic particles. The fine particles (P) can be used alone or in combination of two or more kinds.

Examples of the fine particles (P) include inorganic particles such as calcium carbonate, magnesium carbonate, barium sulfate, titanium oxide, magnesium oxide, zinc oxide, zirconium oxide, aluminum oxide, aluminum hydroxide, silica (silicon dioxide), calcined calcium silicate, calcined kaolin, hydrated calcium silicate, calcium silicate, aluminum silicate, magnesium silicate, calcium phosphate, glass, talc, clay, mica, carbon black, and white carbon; and resin particles such as crosslinked styrene type resin particles, high molecular weight type styrene resin particles, and crosslinked siloxane resin particles. The fine particles (P) may be particles obtained by surface-treating the above-listed particles with a fatty acid or the like. Among the above-listed compounds, for example, mica is preferable. Mica may be either synthetic mica or natural mica.

<Optional Components>

The thermoplastic resin film according to the present invention may include, in addition to the above components, one kind or two or more kinds of optional components as necessary within the range not impairing the object of the present invention.

Examples of the optional components include various additives such as an antioxidant, a thermal degradation inhibitor, a ultraviolet absorber, a light stabilizer, a plasticizer, a lubricant, a release agent, a polymer processing aid, an antistatic agent, a flame retardant, a dye pigment, an organic dye, an impact resistance modifier, a foaming agent, a filler, and a phosphor.

The timing to add the above optional components is not particularly limited, and may be added, for example, at the time of polymerization of at least one kind of the thermoplastic resin (R), or added to at least one kind of the polymerized thermoplastic resin (R), or added at the time of kneading or after kneading at least one kind of the thermoplastic resin (R), fine particles (P), and optional components as necessary.

<Antioxidant>

The antioxidant alone is effective for preventing the oxidative deterioration of the resin in the presence of oxygen. Examples of the antioxidant include a phosphorus-based antioxidant, a hindered phenol-based antioxidant, and a thioether-based antioxidant. As the antioxidant, an antioxidant including a moiety having the effect of a phosphorus-based antioxidant and a moiety having the effect of a hindered phenol-based antioxidant in one molecule can be used. The antioxidants can be used one kind or in combination of two or more kinds. Among them, in terms of the effect of preventing deterioration of optical characteristics due to coloration, a phosphorus-based antioxidant, a hindered phenol-based antioxidant and the like are preferable, and a combination of a phosphorus-based antioxidant and a hindered phenol-based antioxidant is more preferable. When the phosphorus-based antioxidant and the hindered phenol-based antioxidant are used in combination, the mass ratio of the amount of the phosphorus-based antioxidant used to the amount of the hindered phenol-based antioxidant used is preferably 1:5 to 2:1, and more preferably 1:2 to 1:1.

Examples of preferable phosphorus-based antioxidant include 2,2-methylenebis (4,6-di-t-butylphenyl) octyl phosphite (product name: ADK Stab HP-10 manufactured by ADEKA Corporation), tris(2,4-di-t-butylphenyl) phosphite (product name: IRGAFOS 168 manufactured by BASF), and 3,9-bis (2,6-di-t-butyl-4-methylphenoxy)-2,4,8,10-tetraoxa-3,9-diphosphaspiro [5.5] undecane (product name: ADK Stab PEP-36 manufactured by ADEKA Corporation).

Examples of preferable hindered phenol-based antioxidant include pentaerythrityl tetrakis [3-(3,5-di-t-butyl-4-hydroxyphenyl) propionate] (product name IRGANOX 1010 manufactured by BASF), and octadecyl-3-(3,5-di-t-butyl-4-hydroxyphenyl) propionate (product name: IRGANOX 1076 manufactured by BASF).

Examples of preferable antioxidant including a moiety having the effect of a phosphorus-based antioxidant and a moiety having the effect of a hindered phenol-based antioxidant in one molecule include 6-[3-(3-t-butyl-4-hydroxy-5-methyl) propoxy]-2,4,8,10-tetra-t-butyldibenz[d,f][1,3,2]-dioxasosphepin (product name: Sumilizer GP manufactured by Sumitomo Chemical Co., Ltd.).

<Thermal Degradation Inhibitor>

The thermal degradation inhibitor is capable of preventing thermal degradation of the resin by capturing polymer radicals generated when the resin is exposed to high heat under substantially oxygen-free conditions. Examples of the thermal degradation inhibitor include 2-t-butyl-6-(3'-t-butyl-5'-methylhydroxybenzyl)-4-methylphenyl acrylate (product name Sumilizer GM manufactured by Sumitomo Chemical Co., Ltd.) and 2,4-di-t-amyl-6-(3',5'-di-t-amyl-2'-hydroxy-α-methylbenzyl) phenyl acrylate (Sumilizer GS manufactured by Sumitomo Chemical Co.,).

<Ultraviolet Absorber>

The ultraviolet absorber is a compound capable of absorbing ultraviolet rays. The ultraviolet absorber is a compound which is said to have the main function of converting light energy into thermal energy. Examples of the ultraviolet absorber include benzophenones, benzotriazoles, triazines, benzoates, salicylates, cyanoacrylates, oxalic anilides, malonic esters, and formamidines. One kind or two or more kinds of these compounds can be used. Among them, benzotriazoles, triazines, or ultraviolet absorbers having a maximum value $\varepsilon_{max}$ of the molar extinction coefficient at a wavelength of 380 to 450 nm of 1200 $dm^3 \cdot mol^{-1}$ $cm^{-1}$ or less are preferable.

Benzotriazoles are highly effective in preventing deterioration of optical properties due to coloration by UV irradiation. Examples of the benzotriazoles include 2-(2H-benzotriazol-2-yl)-4-(1,1,3,3-tetramethylbutyl) phenol (product name TINUVIN 329 manufactured by BASF), 2-(2H-benzotriazol-2-yl)-4,6-bis (1-methyl-1-phenylethyl) phenol (product name: TINUVIN 234 manufactured by BASF), and 2,2'-methylenebis [6-(2H-benzotriazol-2-yl)-4-tert-octylphenol] (LA-31 manufactured by ADEKA Corporation).

An ultraviolet absorber having a maximum value $\varepsilon_{max}$ of the molar extinction coefficient at a wavelength of 380 to 450 nm of 1200 $dm^3 \cdot mol^{-1}$ $cm^{-1}$ or less can reduce the yellow color of the obtained thermoplastic resin film. Examples of such an ultraviolet absorber include 2-ethyl-2'-ethoxy-oxalanilide (product name Sanduvor VSU manufactured by Clariant Japan Ltd).

Among the above-listed ultraviolet absorbers, benzotriazoles and the like are preferably used, because it can effectively prevent the resin from deteriorating due to UV irradiation.

In addition, an ultraviolet absorber of triazines is preferably used when it is desired to efficiently absorb light at a wavelength around 380 nm. Examples of such an ultraviolet absorber include 2,4,6-tris(2-hydroxy-4-hexyloxy-3-methylphenyl)-1,3,5-triazine (LA-F70 manufactured by ADEKA Corporation) and hydroxyphenyltriazine-based ultraviolet absorbers (TINUVIN 477-D, TINUVIN 460, TINUVIN 479 manufactured by BASF), which are analogues thereof.

Further, when it is desired to particularly effectively absorb light at a wavelength of 380 to 400 nm, it is preferable to use a metal complex with heterocyclic ligands (e.g., a compound having a structure represented by the following formula (A)) disclosed in International Patent Publication No. WO 2011/089794, International Patent Publication No. WO 2012/124395, Japanese Unexamined Patent Application Publication Nos. 2012-012476, 2013-023461, 2013-112790, 2013-194037, 2014-62228, 2014-88542, and 2014-88543 as the ultraviolet absorber.

[Chemical Formula 1]

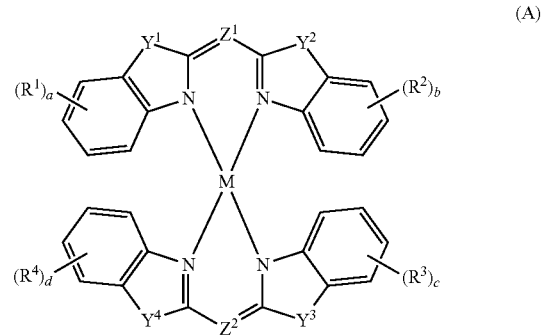

(A)

In the formula (A), M is a metal atom. Further, each of $Y^1$, $Y^2$, $Y^3$, and $Y^4$ is independently a divalent group other than a carbon atom (such as oxygen atom, sulfur atom, NH, and $NR^5$). Here, $R^5$ is a substituent such as an alkyl group, an aryl group, a heteroaryl group, a heteroaralkyl group, and an aralkyl group. This substituent may further include a substituent on this substituent. Each of $Z^1$ and $Z^2$ is independently a trivalent group (such as nitrogen atom, CH, and $CR^6$). Here, $R^6$ is a substituent such as an alkyl group, an aryl group, a heteroaryl group, a heteroaralkyl group, and an aralkyl group. This substituent may further include a substituent on this substituent. Further, each of $R^1$, $R^2$, $R^3$ and $R^4$ is independently a substituent such as a hydrogen atom, an alkyl group, a hydroxyl group, a carboxyl group, an alkoxyl group, a halogeno group, an alkylsulfonyl group, a monophorinosulfonyl group, a piperidinosulfonyl group, a thiomorpholinosulfonyl group, and a piperazinosulfonyl group. This substituent may further include a substituent on this substituent. Here, a, b, c, and d represent the numbers of $R^1$, $R^2$, $R^3$ and $R^4$, respectively, and are each an integer of one of 1 to 4.

Examples of the heterocyclic ligands include 2,2'-iminobisbenzothiazole, 2-(2-benzothiazolylamino) benzoxazole, 2-(2-benzothiazolylamino) benzimidazole, 2-(2-benzothiazolyl)(2-benzimidazolyl) methane, bis(2-benzoxazolyl) methane, bis(2-benzothiazolyl) methane, bis[2-(N-substituted) benzimidazolyl] methane, and derivatives thereof.

Copper, nickel, cobalt, and zinc are preferably used as the central metal of the metal complex.

In order to use the metal complex as the ultraviolet absorber, it is preferable to disperse the metal complex in a medium such as a low molecular weight compound or a polymer. The amount of the metal complex to be added based on 100 parts by mass of the thermoplastic resin is preferably 0.01 to 5 parts by mass, and more preferably 0.1 to 2 parts by mass. Since the metal complex has a large molar extinction coefficient at a wavelength of 380 to 400 nm, the metal complex can be added in a small amount to achieve a sufficient ultraviolet absorbing effect. A small amount of the metal complex to be added can effectively prevent the film appearance from deteriorating due to, for example, bleed-out. Moreover, since the metal complex has high heat resistance, the film hardly deteriorates or decomposes while it is being formed. Furthermore, as the metal complex has high light resistance, the ultraviolet absorbing performance can be maintained for a long time.

The maximum value $\varepsilon_{max}$ of the molar extinction coefficient of the ultraviolet absorber is measured as follows. 10.00 mg of the ultraviolet absorber is added to 1 L of cyclohexane and dissolved until no undissolved substances can be observed visually. This solution is poured into a quartz glass cell of 1 cm×1 cm×3 cm and the absorbance at a wavelength of 380 to 450 nm is measured using a U-3410 spectrophotometer manufactured by Hitachi, Ltd. Using the molecular weight ($M_{UV}$) of the ultraviolet absorber and the maximum value ($A_{max}$) of the measured absorbance, the maximum value $\varepsilon_{max}$ of the molar extinction coefficient is calculated by the following formula.

$$\varepsilon_{max}=[A_{max}/(10\times 10^{-3})]\times M_{UV}$$

<Light Stabilizer>

The light stabilizer is a compound to have a function of capturing radicals generated mainly by oxidation by light. Examples of preferable light stabilizers include hindered amines such as compounds having a 2,2,6,6-tetraalkylpiperidine skeleton.

<Lubricant>

Examples of the lubricant include stearic acid, behenic acid, stearoamide acid, methylene bisstearamide, hydroxystearic acid triglyceride, paraffin wax, ketone wax, octyl alcohol, and hydrogenated oil. These compounds can be used alone or in combination of two or more.

<Release Agent>

Examples of the release agent include higher alcohols such as cetyl alcohol and stearyl alcohol; and glycerin higher fatty acid esters such as stearic acid monoglyceride and stearic acid diglyceride. These compounds can be used alone or in combination of two or more.

It is preferable to use higher alcohols and glycerin fatty acid monoesters in combination as a release agent. When higher alcohols and glycerin fatty acid monoesters are used in combination, the ratio of them is not particularly limited. However, the mass ratio of the amount of higher alcohols used to the amount of glycerin fatty acid monoester used is preferably 2.5:1 to 3.5:1, and more preferably 2.8:1 to 3.2:1.

<Polymer Processing Aid>

As the polymer processing aid, for example, polymer particles manufactured by the emulsion polymerization method and consist of 60 mass % or more of methyl methacrylate units and 40 mass % or less of vinyl-based monomer units that can be copolymerized with the methyl methacrylate units, having an average degree of polymerization of 3,000 to 40,000, and having a particle diameter of 0.05 to 0.5 μm are used. Such polymer particles may be single layer particles composed of polymers having a single composition and single intrinsic viscosity or may be multi-layer particles composed of two or more kinds of polymers having compositions or intrinsic viscosities different from each other. Particularly preferred are two-layer particles including a polymer layer having relatively low intrinsic viscosity as an inner layer and a polymer layer having relatively high intrinsic viscosity of 5 dl/g or more as an outer layer. The polymer processing aid preferably has intrinsic viscosity of 3 to 6 dl/g. When the intrinsic viscosity is too low or too high, the film formability may decrease. Specific examples of the polymer processing aid include Metablen-P series manufactured by Mitsubishi Rayon Co., Ltd. and Pararoid series manufactured by Rohm and Haas Company, by Dow Chemical Company, and by Kureha Chemical Industry Co., Ltd. The amount of the polymer processing aid blended in the thermoplastic resin film according to the present invention based on 100 parts by mass of the total amount of the thermoplastic resin is preferably 0.1 to 5 parts by mass. When the amount of the polymer processing aid to be blended is less than 0.1 parts by mass, the moldability may decrease, while when the amount of the polymer processing aid to be blended exceeds 5 parts by mass, the melt fluidity may decrease.

<Organic Dye>

As the organic dye, a compound having a function of converting ultraviolet rays into visible light and the like is preferably used.

<Phosphor>

Examples of the phosphor include a fluorescent pigment, a fluorescent dye, a fluorescent white dye, a fluorescent brightening agent, and a fluorescent whitening agent. These agents can be used alone or in combination of two or more.

The total amount of the above various additives is not particularly limited, and is generally 0.01 to 20 mass %, and preferably 0.05 to 1.5 mass % in 100% mass % of the thermoplastic resin film.

For applications such as decorating films, the thermoplastic resin film according to the present invention preferably has moisture permeability of 80 g/day/m² or less at a temperature of 40° C. and relative humidity of 90% measured in accordance with JIS Z 0208. When the moisture permeability satisfies the above requirement, the influence of moisture on the substrate is reduced, which is preferable.

"Method of Manufacturing Thermoplastic Resin Film"

The thermoplastic resin film according to the present invention can be manufactured using the thermoplastic resin composition (C) including the thermoplastic resin (R), the fine particles (P), and, if necessary, other optional components. It is preferable that each component be dispersed substantially evenly in the thermoplastic resin composition (C).

As a method of manufacturing a thermoplastic resin film, there are known a method of melting and kneading a plurality of kinds of raw materials including the thermoplastic resin (R) and the fine particles (P) to prepare the thermoplastic resin composition (C) and molding the obtained resin composition (C) into a film shape.

The method of manufacturing a thermoplastic resin film according to the present invention preferably includes melting and extruding the thermoplastic resin composition (C) from a T-die into a film shape, and sandwiching a melted product extruded into a film shape (hereinafter may be abbreviated as simply a "melted product") between a pair of cooling rollers, which are metallic rigid rollers, or one is a metallic rigid roller and the other is a metallic elastic rollers.

<Melt-Kneading>

A plurality of kinds of raw materials including the thermoplastic resin (R) and the fine particles (P) may be melted and kneaded all together, or may be melted and kneaded separately in several times. The melting and kneading can be carried out using a melt-kneading apparatus such as a kneader rudder, an extruder, a mixing roller, or a Banbury mixer. The kneading temperature is appropriately adjusted according to the melting temperature of the resin component, and is usually preferably within a range of 140° C. to 300° C. The shear rate applied to the thermoplastic resin composition (C) during the melting and kneading is preferably 100 $sec^{-1}$ or more, and more preferably 200 $sec^{-1}$ or more.

After the melting and kneading at the above temperature, the obtained melt-kneaded product is cooled to a temperature of 120° C. or lower. Rapid cooling is preferable to natural cooling for the cooling. Examples of the rapid cooling method include a method of immersing melted strands in a cold water tank.

The thermoplastic resin composition (C) obtained by the melting and kneading may be in any form such as pellets, granules, and powder in order to improve convenience for storage, transportation, or molding.

<Film Molding>

Examples of the film molding method include an extrusion molding method, a solution casting method, a melt casting method, an inflation molding method, and a blow molding method. Among them, the extrusion molding method is preferable. The extrusion molding method can manufacture a film having high transparency, a uniform thickness, and smooth surface with relatively high productivity.

In the extrusion molding method, an extruder with a T-die is preferably used. The extruder with a T-die includes a raw material charging unit such as a hopper into which the raw material thermoplastic resin composition (C) is charged, a screw unit that heats and melts the charged thermoplastic resin composition (C) and sending it out to a T-die side, and a T-die that extrudes the heated and melted thermoplastic resin composition (C) into a film shape.

In the extruder with the T-die, it is preferable that a fixed amount of the molten resin be supplied to the T-die using a gear pump. This manufactures a film with high accuracy in the thickness. It is preferable that the after impurities of the molten resin be removed by filtration using a polymer filter or the like and the molten resin be supplied to the T-die. The set temperature of the extruder with the T-die is not particularly limited and is set according to the composition of the thermoplastic resin composition (C), preferably 160 to 300° C., more preferably 220 to 280° C., further more preferably 240 to 270° C., and particularly preferably 250 to 260° C. It is also preferable that the temperature from a leading end of the extruder to the T-die be set to the above temperature. The set temperature of the extruder with the T-die is the melting temperature (processing temperature) of the thermoplastic resin composition (C).

The thermoplastic resin composition (C) melted at the above temperature is extruded vertically downward into a film shape from a discharge port of the T-die. The temperature distribution of the T-die is preferably ±15° C. or less, more preferably ±5° C. or less, and particularly preferably ±1° C. or less. When the temperature distribution of the T-die exceeds ±15° C., viscosity of the molten resin becomes uneven, and the obtained film may be, for example, distorted due to uneven thickness and uneven stress, which is not preferable.

Examples of methods of cooling the melted product extruded from the T-die include a nip roller method, an electrostatic application method, an air knife method, a calendaring method, a single-sided belt method, a double-sided belt method, and a triple roller method. In the present invention, the nip roller method is preferable. The nip roll method can easily manufacture a film excellent in printability.

In the nip roll method, the melted product extruded from the T-die is cooled and pressurized by a cooling roller unit including plurality of cooling rollers (nip rollers) disposed adjacent to each other with a space having a separation distance corresponding to a desired thickness of the thermoplastic resin film apart from each other.

Hereinafter, in the cooling roller unit, the n-th (n is an integer of one or more) cooling roller from the upstream side is referred to as an "nth cooling roller". The cooling roller unit includes at least a first cooling roller and a second cooling roller having a space below the discharge port of the T-die. The number of cooling rollers is two or more, preferably three to four.

The melted product extruded from the T-die is sandwiched between the first cooling roller and the second cooling roller and is pressurized and cooled to become a thermoplastic resin film. The thermoplastic resin film is not sufficiently cooled by the cooling roller unit alone, and the thermoplastic resin film is not usually completely solidified even at the time of being separated from the most downstream cooling roller. After being separated from the most downstream cooling roller, the thermoplastic resin film is further cooled while flowing down.

In the present invention, it is preferable that both of the first cooling roller and the second cooling roller be metallic rigid rollers, or one is a metallic rigid roller and the other is a metallic elastic roller.

The metallic rigid rollers are highly rigid metallic rollers that do not deform while the film is being manufactured. The surface of the metallic rigid roller is smooth, preferably a mirror surface. A known metallic rigid roller commonly used in extrusion molding can be used as the metallic rigid roller. As the metallic rigid roller, for example, a double metallic rigid roller including an inner roller composed of a metallic hollow roller such as a drilled roller or a spiral roller and a metallic outer tube having a smooth surface may be used. In this metallic rigid roller, a cooling fluid flows downward between inside the inner roller and/or between the inner roller and the outer tube. The outer tube is thick enough so that it is not deformed while the film is being manufactured and is, for example, about 20 mm. Materials for the inner roller and the outer tube are not particularly limited, and examples thereof include stainless steel and chrome steel.

The metallic elastic roller is a metallic roller having a surface that is elastically deformable while the film is being manufactured. The surface of the metallic elastic roller is smooth, preferably a mirror surface. A known metallic elastic roller that has been commonly used in extrusion molding can be used as the metallic elastic roller. As the metallic elastic roller, for example, a double metallic elastic roller including an inner roller composed of a metallic hollow roller and a metallic outer tube having a surface that is smooth and is elastically deformable while the film is being manufactured may be used. In this metallic elastic roller, a cooling fluid flows downward between inside the inner roller and/or between the inner roller and the outer tube. Rubber or any fluid not for a cooling purpose may be disposed between the inner roller and the outer tube. The outer tube is thin enough so that it can be elastically deformed without being broken while the film is being manufactured and is, for example, about 2 to 8 mm. It is preferable that the outer tube have a seamless structure without a welded joint. Materials for the inner roll and the outer tube are not particularly limited, and examples thereof include stainless steel and chrome steel.

When two metallic rigid rollers are used, the outer tubes of the rollers are not deformed and come into point contact with the melted product when viewed in cross section. In contrast, the metallic elastic roller is elastically deformed along with the melted product that is being pressed. Therefore, when at least one metallic elastic roller is used, the length of the metallic elastic roller contacting with the melted product is relatively long when viewed in cross section, and the metallic elastic roller can be in line contact with the melted product, thereby enabling the melted product to be pressurized with more uniform linear pressure.

By sandwiching the melted product between the first cooling roller and the second cooling roller, the film forming property of the film improves, and it is possible to effectively prevent the thicknesses of the films from becoming uneven and streaks from occurring. The thickness of the film can be reduced as well.

Further, when the metallic rigid rollers or the metallic elastic rollers having smooth or, preferably, mirrored surfaces are used as the first cooling roller and second cooling roller for sandwiching the melted product, at least one film surface can be highly glossy at an ordinary temperature and can have favorable printability. Basically, it is possible to make both the film surfaces highly glossy at an ordinary temperature and have favorable printability.

As described above, in the present invention, there is no need for the film to have a favorable matte appearance while the film is being manufactured, and thus it is not necessary for the fine particles (P), which are the matting agent, to sufficiently protrude from the film surface while the film is being manufactured. Thus, after the thermoplastic resin composition (C) in which the fine particles (P), which are the matting agent, are dispersed is molded into a film shape, and the obtained melted product is sandwiched between the pair of cooling rollers, there is no problem if the fine particles (P) may be pushed inside the film, and the matte appearance may be impaired.

As compared with the metallic rigid rollers or metallic elastic rollers, non-metallic rollers such as rubber rollers have less smooth surfaces, and it is difficult for them to achieve a highly glossy film surface.

In the manufacturing method according to the present invention, metallic rigid rollers can be used for both the first cooling roller and second cooling roller. However, as described above, when the metallic elastic rollers are used, the length of the metallic elastic roller contacting with the melted product is relatively long when viewed in cross section, and thus the melted product can be pressurized with more uniform linear pressure. Accordingly, the effect of reducing the residual stress in the film, the effect of thinning the film and the like are achieved. It is thus preferable to use a metallic elastic roller for one of the cooling rollers (the first cooling roller or the second cooling roll).

When a metallic elastic roller is used, a metallic rigid roller that supports the melted product from a side opposite the side supported by a metallic elastic roller when viewed in cross section is indispensable. That is, in the present invention, it is particularly preferable to use a metallic rigid roller for one of the first cooling roller and second cooling roller and a metallic elastic roller for the other one of them.

It is preferable that at least one of the first cooling roller and second cooling roller be designed such that outer diameters of both end parts of the roller are somewhat smaller than the outer diameter of the central part of the roller. In this case, a step between both end parts of the roller and the central part of the roller formed on an outer peripheral surface is preferably 0.5 to 1.0 mm in thickness. When the step is formed on the outer peripheral surface of at least one of the cooling rollers, both end parts of the film can be slightly thicker than the central parts of the film, thereby preventing the film from breaking and thus the productivity from decreasing. The shape of the step is not particularly limited, and may be any of a vertical shape, a tapered shape, and a stepped shape. Both end parts of the film, which are slightly thicker than the central part of the film, can be cut and removed in a later step, if necessary.

The linear pressure applied to the melted product by the first cooling roller and second cooling roller is not particularly limited and, in terms of uniform pressurization on the melted product, is preferably 5 kg/cm or more, more preferably 10 kg/cm or more, further more preferably 20 kg/cm, and particularly preferably 30 kg/cm or more. The upper limit of the linear pressure applied to the melted product by the first cooling roller and second cooling roller is not particularly limited and is about 50 kg/cm, because it is possible to elastically deform the cooling rollers and prevent the film from breaking with that pressure.

As described above, in the manufacturing method according to the present invention, preferably, after the thermoplastic resin composition (C), in which the fine particles (P) are dispersed, is melted and extruded, the melted product is sandwiched between the pair of cooling rollers, which are both metallic rigid rollers or one is a metallic rigid roller and the other is a metallic elastic roller (the first cooling roller and second cooling roller).

This method can manufacture a thermoplastic resin film in which the adhesion of the melted product to the pair of cooling rollers and the releasability of the melted product from the pair of cooling rollers are favorable, which can effectively prevent the fine particles (P) from protruding from the film surface, and at least one of the film surfaces is highly glossy and has excellent printability when the film is being manufactured.

The smaller the difference between the surface temperature of the cooling roller and the glass transition temperature (Tg) of the thermoplastic resin composition (C), the more the adhesion of the melted product to the cooling roller tends to increase, the more the surface smoothness and the surface glossiness of the film tend to increase, and the more the releasability of the melted product from the cooling roller tends to decrease.

In the manufacturing method according to the present invention, the following formula (4) is preferably satisfied, and the following formula (5) is more preferably satisfied, where T1 is the surface temperature of one of the first cooling roller and the second cooling roller, T2 is the surface temperature of the other cooling roller (provided that T2≥T1), and TgC is the glass transition temperature (Tg) of the thermoplastic resin composition (C).

$$10 \leq |TgC - T2| \leq 40 \tag{4}$$

$$15 \leq |TgC - T2| \leq 20 \tag{5}$$

TgC of the thermoplastic resin composition (C) suitable for use in the present invention is preferably 70 to 125° C., and more preferably 90 to 110° C. T2 is preferably 60 to 90° C., and more preferably 70 to 80° C. When T2 is 60 to 90°

C., the balance between the surface smoothness and surface glossiness of the film and the releasability of the melted product from the cooling roller becomes favorable, which is preferable.

Since the thermoplastic resin film is sufficiently pressurized and cooled by the first cooling roller and the second cooling roller, when the cooling roller unit includes third and subsequent cooling rollers, the material thereof is not particularly limited. Metallic rigid rollers are preferable as the third and subsequent cooling rollers. Further, when the cooling roller unit includes the third and subsequent cooling rollers, the surface temperature of the cooling roller unit is not particularly limited. The surface temperature of the third and subsequent cooling rollers is preferably 50 to 90° C., and more preferably 60 to 80° C.

"Film Manufacturing Apparatus"

FIG. 1 shows an embodiment of a film manufacturing apparatus by an extrusion molding method.

FIG. 1 is a schematic diagram of the film manufacturing apparatus.

As shown in FIG. 1, a film manufacturing apparatus 1 includes extrusion molding means 110 for heating and melting a raw material resin composition 210M (resin composition (C)) and extruding it into a film shape. In this embodiment, the extrusion molding means 110 is an extruder with a T-die that includes a raw material charging unit 111 such as a hopper into which the raw material resin composition 210M is charged, a screw unit 112 for heating, melting, and extruding the resin composition 210M, and a T-die 113 including a discharge port 113A for discharging the heated and melted resin composition 210M into a film shape.

The film manufacturing apparatus 1 further includes a cooling roller unit 120 that is composed of a plurality of cooling rollers. The cooling rollers are disposed adjacent to each other with a space having a separated distance corresponding to a desired thickness of the resin film 210 apart from each other. The cooling rollers cool the melted product extruded by the extrusion molding means with the T-die 110 while pressurizing it. The cooling roller unit 120 includes at least a first cooling roller 121 and a second cooling roller 122 having a space below the discharge port 113A of the T-die 113.

The melted product extruded from the T-die 113 is sandwiched between the first cooling roller 121 and the second cooling roller 122, pressurized and cooled, and becomes a resin film 210. At this point, the resin film 210 is not sufficiently cooled and is not completely solidified.

In the example shown, the cooling roller unit 120 includes the first cooling roller 121, the second cooling roller 122, a third cooling roller 123, and a fourth cooling roller 124. The melted product obtained by being cooled while being sandwiched and pressurized between the first cooling roller 121 and the second cooling roller 122 moves away from the first cooling roller 121, is cooled while passing over the surface of the second cooling roller 122, supplied between the second cooling roller 122 and the third cooling roller 123, and then pressurized.

The resin film 210 gradually formed from the melted product is separated from the second cooling roller 122 and further cooled while passing over the surface of the third cooling roller 123, supplied between the third cooling roller 123 and the fourth cooling roller 124, and then pressurized. Note that the resin film 210 does not need to be pressurized between the second cooling roller 122 and the third cooling roller 123 and/or between the third cooling roller 123 and the fourth cooling roller 124 (not shown). The resin film 210 then moves away from the third cooling roller 123 and is cooled while passing over the surface of the fourth cooling roller 124. After that, the resin film 210 moves away from the fourth cooling roller 124, and the process proceeds to the next step. At this point, the resin film 210 is not sufficiently cooled and is not completely solidified.

In this embodiment, the T-die 113 and the cooling roller unit 120 of the extrusion molding means 110 are disposed inside a first manufacturing room R1. The ambient temperature in the first manufacturing room R1 is not particularly adjusted and is, for example, about 35 to 40° C., which is higher than an ordinary temperature (20 to 25° C.) due to the presence of the heated and melted resin.

In this embodiment, a second manufacturing room R2 is provided adjacent to the first manufacturing room R1. The ambient temperature in the second manufacturing room R2 is preferably adjusted within a range of 20 to 50° C. in order to gradually cool the resin film 210, which has been obtained by being pressurized and cooled by the cooling roller unit 120. The ambient temperature in the second manufacturing room R2 can be adjusted using known air-conditioning equipment or the like.

The film manufacturing apparatus 1 may include known stretching means (not shown) for stretching the resin film 210 as necessary. The film manufacturing apparatus 1 may include known protective film attaching means (not shown) for attaching a protective film to at least one of the film surfaces of the manufactured resin film 210 as necessary. The film manufacturing apparatus 1 may include a take-up roller (not shown) for taking up the manufactured resin film 210 as necessary.

The thickness of the thermoplastic resin film is not particularly limited.

As described in the section "Solution to Problem", when the thickness is 5 to 250 μm, usually the film is classified mostly as "film", and when the thickness exceeds 250 μm, the film is mostly classified as "sheet". However, the present specification does not make such a distinction between the film and sheet, and the film and sheet are collectively referred to as a "film".

The thickness of the unstretched thermoplastic resin film (unstretched film) manufactured by the above manufacturing method is preferably 10 to 500 μm, more preferably 30 to 400 μm, particularly preferably 40 to 300 μm, and most preferably 50 to 200 μm. Films having a thickness of less than 10 μm tend to be difficult to be manufactured. When the thickness exceeds 500 μm, the secondary processability such as a lamination property, a handling property, a cutting property, and a punching property decreases and the material cost per unit area tends to increase.

The thermoplastic resin film according to the present invention may be a stretched film. That is, the above-mentioned unstretched film may be stretched so that it becomes a stretched film. The stretching treatment increases the mechanical strength and achieves a film that is difficult to crack. The stretching method is not particularly limited, and examples thereof include a simultaneous biaxial stretching method, a sequential biaxial stretching method, and a tubular stretching method. In terms of enabling uniform stretching and achieving a high strength film, the lower limit of the stretching temperature is preferably 10° C. higher than the glass transition temperature (Tg) of the thermoplastic resin composition (C), and the upper limit of the stretching temperature is preferably 40° C. higher than the glass transition temperature (Tg) of the thermoplastic resin composition (C).

"Printed Resin Film"

The printed resin film according to the present invention is obtained by printing at least one of the film surfaces of the thermoplastic resin film according to the present invention. Usually, one of the film surfaces of the above-described thermoplastic resin film according to the present invention is printed. Since at least one of the film surfaces of the thermoplastic resin film according to the present invention is highly glossy at an ordinary temperature, when the highly glossy film surface is printed, it is possible to achieve a printed resin film with a small number of unprinted parts and a favorable print appearance. As described above, the method of manufacturing a thermoplastic resin film according to the present invention can manufacture a thermoplastic resin film in which both film surfaces are highly glossy. When the $G_L$ values of the pair of film surfaces differ from each other, it is preferable to print the surface with a higher $G_L$ value, because the quality of the printing can be higher on the surface with a higher $G_L$ value.

The printing method is not particularly limited, and a known printing method such as a gravure printing method, a flexographic printing method, and a silk screen printing method can be used.

When the printed resin film according to the present invention is laminated on a substrate, it is preferable to layer the film in such a way that the printed surface comes into contact with the substrate, because this will provide protection and a rich impression to the printed surface.

"Matte Resin Film"

The matte resin film according to the present invention is obtained by applying a heat treatment to the thermoplastic resin film according to the present invention. It is preferable that at least one of the film surfaces of the thermoplastic resin be printed.

By using the above-described thermoplastic resin film according to the present invention, it is possible to provide a matte resin film with a small number of unprinted parts, a favorable print appearance, and a favorable matte appearance.

The temperature and time of the heat treatment for developing the matte appearance are set such that at least one of the film surfaces and the thermoplastic resin composition (C) near the at least one of the film surfaces are sufficiently softened, so that a sufficient number of fine particles (P) projects from the film surface to thereby develop a favorable matte appearance. The heat treatment temperature is equal to or higher than the softening temperature of the thermoplastic resin composition (C), preferably Tg to Tg+50° C., and more preferably Tg+10° C. to Tg+20° C. The heat treatment time is preferably 15 minutes to 30 minutes.

The higher the heat treatment temperature and the longer the heat treatment time, the more the number of the fine particles (P) protruding from the film surface tends to be, and the higher the level of matting tends to be. In the present invention, it is possible to adjust the level of matting by adjusting the heat treatment conditions after the film is manufactured. As the heating means, for example, an oven, a dryer, and an incubator can be used, but it is not limited to this as long as it can keep a predetermined temperature. For example, in the post-processing such as lamination, pressure molding, and vacuum molding, which are described later, the step of heating and softening the thermoplastic resin film may also serve as the above-described heat treatment. However, when the thermoplastic resin film is heat-treated by hot pressing using a smooth surfaced press machine, the level of matting tends to decrease, which is not preferable. That is, the heat treatment may be performed in a pressurized state, but it is preferable to perform the heat treatment in a non-pressurized state.

"Laminated Film"

The laminated film according to the present invention includes a plurality of layers including a resin layer composed of the above thermoplastic resin film according to the present invention, the above printed resin film according to the present invention, or the above matte resin film according to the present invention.

Various functional layers can be provided on at least one of the film surfaces of the above thermoplastic resin film according to the present invention, the above printed resin film according to the present invention, or the above matte resin film according to the present invention. Examples of the functional layer include a hard coat layer, an antiglare layer, an antireflection layer, an antisticking layer, a diffusion layer, an antiglare layer, an antistatic layer, an antifouling layer, an easy adhesion layer, and an easy slippable layer including fine particles and the like.

Since the above thermoplastic resin film according to the present invention, the above printed resin film according to the present invention, or the above matte resin film according to the present invention is excellent in adhering to any thermoplastic resin (composition), at least one layer of a thermoplastic resin layer having a resin composition different from that of another thermoplastic resin layer can be laminated on at least one of the film surfaces of the other thermoplastic resin layer.

The method of manufacturing the laminated film is not particularly limited.

There are following methods of manufacturing the laminated film including the thermoplastic resin film according to the present invention.

(1) A method of manufacturing a laminated film by melting and co-extruding the raw material resin composition (C) of the above thermoplastic resin film according to the present invention and another thermoplastic resin (composition).

(2) A method of manufacturing a laminated film by obtaining, in advance, a film from one of the raw material resin composition (C) of the above thermoplastic resin film according to the present invention and another thermoplastic resin (composition), and then melting, extruding, and covering the other thermoplastic resin (composition) over the obtained film.

(3) A method of obtaining, in advance, films from both the raw material resin composition (C) of the above thermoplastic resin film according to the present invention and another thermoplastic resin (composition), and thermocompressing them using pressing, air compressing, and vacuuming etc.

(4) A method of manufacturing a laminated film by obtaining, in advance, a film from the raw material resin composition (C) of the thermoplastic resin film according to the present invention and polymerizing a polymerizable composition on the obtained film.

Note that in the above method (3), in the press thermocompression step, the fine particles (P) do not protrude from the film surface, and no matting appears.

When an exposed surface of the thermoplastic resin film according to the preset invention of the laminated film obtained by any one of the above-listed methods (1) to (4) is printed, the laminated film including the above printed resin film according to the present invention can be obtained. Further, by applying a heat treatment to the laminated film, a laminated film including the above matte resin film according to the present invention can be obtained.

The thermoplastic resins suitable for the layering other than those mentioned above are not particularly limited, and examples thereof include a carbonate-based polymer, a vinyl chloride-based polymer, a vinylidene fluoride-based polymer, a (meth)acrylic-based resin, an ABS-based resin, an AES-based resin, and an AS-based resin. These compounds can be used alone or in combination of two or more.

"Laminated Body"

In the laminated body according to the present invention, the above thermoplastic resin film according to the present invention, the above printed resin film according to the present invention, the above matte resin film according to the present invention, or the above laminated film according to the present invention is laminated on a substrate. By layering the above film on the substrate, the design property of the substrate can be improved. In addition, the effect of protecting the substrate can be achieved.

The material of the substrate is not particularly limited, and examples thereof include a resin, a steel material, wood, glass, and composite materials thereof. The resin used for the substrate is not particularly limited, and examples thereof include a thermoplastic resin or a thermosetting resin. Examples of the thermoplastic resin used for the substrate include carbonate-based resins, ethylene terephthalate-based resins, amide-based resin, olefin-based resins, styrene-based resins, vinyl chloride-based resins, (meth)acrylic-based resins, and ABS-based resins. Examples of the thermosetting resin used for the substrate include epoxy-based resins, phenol-based resins, and melamine-based resins.

The method of manufacturing the laminated body according to the present invention is not particularly limited, and examples thereof include adhesion, lamination, pressure molding, vacuum molding, Three dimension Overlay Method (TOM molding), insert molding, and in-mold molding.

When the material of the substrate is a resin, the thermoplastic resin film according to the present invention, the printed resin film according to the present invention, or the laminated film according to the present invention is preferably vacuum molded, compressed air molded, or compressed and molded on the surface of the substrate. Among them, the injection molding simultaneous lamination method is particularly preferable. In the injection molding simultaneous lamination method, the thermoplastic resin film according to the present invention, the printed resin film according to the present invention, or the laminated film according to the present invention is inserted between a pair of female and male dies for injection molding, and then the melted thermoplastic resin is injected and molded inside the dies (on one surface of the film). In this method, the film can be laminated at the same time that the injection molded body is manufactured.

The film to be inserted into the dies may be flat, or may include recesses and projections that are obtained by preforming the film by vacuum molding, pressure molding or the like. The preforming of the film may be carried out by a separate molding machine or in a metal mold of an injection molding machine used in the injection molding simultaneous lamination method. A method of preforming the film and then injecting the molten resin on one side of the film is referred to as an insert molding method.

When the material of the substrate is a resin, there is also a method of coextruding and molding the substrate and the film to be laminated.

In the laminated body according to the present invention, an outermost layer is the thermoplastic resin film according to the present invention in order to exhibit a favorable matte appearance. Another heat treatment after the above molding develops a favorable matte appearance. Then, a laminated body including the matte resin film according to the present invention is obtained.

Further, a coating layer obtained by being cured by irradiation with ultraviolet rays (UV) or electron beams (EB) can be provided on the film according to the present invention combined with a substrate. This further improves the design property or the protection of the substrate.

"Application"

The thermoplastic resin film according to the present invention, the printed resin film according to the present invention, the matte resin film according to the present invention, the laminated film according to the present invention, and the laminated body according to the present invention can be used for any purpose, can be preferably used for various purposes requiring a design property, and are suitable for applications requiring a matte appearance.

The thermoplastic resin film according to the present invention, the printed resin film according to the present invention, the matte resin film according to the present invention, and the laminated film according to the present invention can be preferably used for decorating films, films for building materials, and the like.

Examples of suitable applications include interior parts such as furniture, pendant lights, and mirrors; and building materials such as doors, sash windows, domes, safety windowpanes, partitions, staircases waistcoats, balcony waistcoats, and building parts for roofs and the like of the buildings for leisure.

Examples of other applications include signboard parts or marking films such as advertisement towers, floor stand signboards, side signboards, transom signboard, and roof signs; display parts such as showcases, dividers, and store displays; lighting components such as fluorescent lamp covers, mood lighting covers, lamp shades, light ceilings, light walls, and chandeliers; transport aircraft related components such as aircraft windshields, pilot visors, motorcycle windshields, motorboat windshields, shading plates for buses, side visors for automobiles, rear visors, head wings, headlight covers, automobile interior parts, and automobile exterior parts such as bumpers; electronic device parts such as acoustic video nameplates, stereo covers, television protection masks, vending machines, mobile phones, and personal computers; medical equipment such as incubators and X-ray parts; equipment related parts such as machine covers, instrument covers, experiment equipment, rulers, dials, and observation windows; parts for solar cells such as solar cell back films and front films for flexible solar cells; various household electric appliances; traffic related parts such as road signs, direction boards, traffic mirrors, and soundproof walls; decorative films serving also protective films provided on the surfaces of conservatories, large water tanks, box water tanks, watch panels, bathroom members such as bath tubs, plumbing parts, desk mats, play parts, toys, musical instruments, wallpapers, and face protection masks or the like used for welding.

EXAMPLES

Hereinafter, the present invention will be described in more detail with reference to examples and comparative examples. However, the present invention is not limited to the following examples at all. In the following descriptions, "part(s)" means "parts by mass" and "%" means "mass %", unless otherwise specified.

[Evaluation Items and Evaluation Methods]

Various evaluations were made by the following method.

(Volume average particle diameter of the fine particles (P))

The volume average particle diameter of the fine particles (P) was measured by the method defined in the section "Solution to Problem".

(Total Haze of Film, Internal Haze, and External Haze)

The total haze, internal haze, and external haze of the thermoplastic resin film were measured by the method defined in the section "Solution to Problem".

(Glass Transition Temperature (Tg))

The glass transition temperature (Tg) of the resin (composition) was measured by the method defined in the section "Solution to Problem".

(Gloss Level $G_L$ and $G_H$)

The gloss $G_L$ and $G_H$ of the thermoplastic resin film were measured by the method defined in the section "Solution to Problem".

(Printability of film)

The thermoplastic resin film was subjected to a gravure printer, and characters and patterns were printed on the film surface with a higher $G_L$ value. The printability was evaluated based on the following criteria.

<Criteria>

A (Good): No unprinted part observed.
B (Passed): A few unprinted parts observed.
C (Failed): Some unprinted parts observed.

(Manufacture Example 1) Polymerization of Acrylic-Based Multilayer Structure Polymer Particles (AX)

(1) 200 parts of deionized water, 1 part of sodium dodecylbenzenesulfonate, and 0.05 part of sodium carbonate were placed in a reactor equipped with a stirrer, a thermometer, a nitrogen gas introduction part, a monomer introduction pipe, and a reflux condenser, and then air inside the container was thoroughly substituted by a nitrogen gas to make the container substantially oxygen free, and then the internal temperature was set at 80° C. Then, 0.01 part of potassium persulfate was added and stirred for 5 minutes, a monomer mixture consisting of 9.48 parts of methyl methacrylate, 0.5 part of n-butyl acrylate, and 0.02 part of allyl methacrylate was continuously dropped and fed over 20 minutes, and after completion of the addition, the polymerization reaction was carried out for 30 minutes so that the polymerization rate was 98% or more.

(2) Next, 0.03 part of potassium persulfate was added into the same reactor and stirred for 5 minutes, then a monomer mixture consisting of 1.45 parts of methyl methacrylate, 27.67 parts of n-butyl acrylate, and 0.88 part of allyl methacrylate was continuously dropped and fed over 40 minutes. After the addition is completed, the polymerization reaction was carried out for 30 minutes so that the polymerization rate was 98% or more.

(3) Next, 0.06 part of potassium persulfate was charged into the same reactor and stirred for 5 minutes, then a monomer mixture including 53.73 parts of methyl methacrylate, 5.97 parts of n-butyl acrylate, and 0.3 parts of n-octyl mercaptan (chain transfer agent) was continuously dropped and fed over 100 minutes, and after completion of the addition, a polymerization reaction was further carried out for 60 minutes so that the polymerization rate was 98% or more, so that a latex including the acrylic-based multilayer structure polymer particles (AX-1). The average particle diameter was 0.09 μm is obtained.

Next, the latex including the acrylic-based multilayer structure polymer particles (AX-1) was frozen at −30° C. for 4 hours. The frozen latex was added to warm water at 80° C. twice as much as the frozen latex and dissolved to manufacture a slurry. After the slurry was kept at 80° C. for 20 minutes, it was dehydrated and dried at 70° C. In the manner described above, a thermoplastic resin composition (AX-2) including powdered acrylic-based multilayer structure polymer particles (AX-1) having a three-layer structure and a linear methacrylic resin was obtained. Further, this thermoplastic resin composition (AX-2) was pelletized by a known method. When the content of the acrylic-based multilayer structure polymer particles (AX-1) in this thermoplastic resin composition (AX-2) was measured using acetone, it was 65 mass %. The glass transition temperature of the thermoplastic resin composition (AX-2) was 98° C., and the refractive index thereof was 1.49.

Example 1

As a raw material, the pellets of the composition (AX-2) including the acrylic-based multilayer structure polymer particles (AX-1) obtained in Production Example 1 and Micromica MK-100K (manufactured by Co-op Chemical Co., Ltd., having a refractive index of 1.53, a volume average particle diameter of 5 μm, and an aspect ratio of 30 to 50) were used as the fine particles (P), a thermoplastic resin film was obtained by melt extrusion molding. The aspect ratio of Micromica MK-100K is the catalog value calculated by the average particle size/thickness. The mass ratio of the composition (AX-2) including the acrylic-based multilayer structure polymer particles (AX-1) to the fine particles (P) was 97/3.

First, the thermoplastic resin composition (C) composed of a mixture of the above raw materials was melted and extruded into a film shape using a single-shaft vent extruder with a T-die. The melt extrusion conditions were as follows. The set temperature of the extruder (melting temperature of the resin composition): 260° C.,
Screw diameter: 75 mm,
T-die width: 1850 mm,
T-die lip opening: 0.8 mm,
Discharge rate of molten resin from T-die: 110 kg/h.

Next, the melted product extruded into a film shape was pressurized and cooled using a cooling roller unit composed of first to fourth cooling rollers (nip rollers). A metallic elastic roller having temperature adjusted to 64° C. was used as the first cooling roller (hereinafter sometimes abbreviated as "first roller"), and a metallic rigid roller having a temperature adjusted to 79° C. is used as the second cooling roller (hereinafter sometimes abbreviated as "second roller"). A metallic rigid roller having a temperature adjusted to 65° C. was used as the third cooling roller, and a metallic rigid roll having a temperature adjusted to 60° C. was used as the fourth cooling roller. The surface of each of the cooling rollers was a mirror surface. Further, the distance between the respective rollers was set to 75 μm, and the linear pressure applied to the melted product was set to 30 kg/cm between the respective rollers. After the melted product was pressurized and cooled by the cooling roller unit, an unstretched thermoplastic resin film having a thickness of 75 μm was obtained by the same method as the known method. Various evaluations were made on the obtained thermoplastic resin film. Main manufacturing conditions and evaluation results are shown in Table 1.

Example 2

A thermoplastic resin film having a thickness of 75 μm was obtained in the manner same as that in Example 1 except that the fine particles (P) used were "SJ-010" (volume average particle diameter 10 μm, and the aspect ratio 10 to 30) manufactured by Yamaguchi Mica Co., Ltd. and the content thereof was 2 mass %. Main manufacturing conditions and evaluation results are shown in Table 1.

Example 3

A thermoplastic resin film having a thickness of 75 μm was obtained in the same manner as that in Example 1 except that a methacrylic-based resin (B) ("Parapet EH" manufactured by Kuraray Co., Ltd.) was used as the thermoplastic resin (R) in addition to the acrylic-based multilayer structure polymer particles (AX-1). A mass ratio of the composition (AX-2) including the acrylic-based multilayer structure polymer particles (AX-1), the methacrylic-based resin (B), and the fine particles (P) was 77/20/3. Main manufacturing conditions and evaluation results are shown in Table 1.

Example 4

A thermoplastic resin film having a thickness of 75 μm was obtained in the same manner as that in Example 1 except that both the first cooling roller and the second cooling roller were made of metallic rigid rollers. Main manufacturing conditions and evaluation results are shown in Table 1.

Comparative Example 1

A thermoplastic resin film having a thickness of 75 μm was obtained in the same manner as that in Example 1 except that "A-21S" (volume average particle diameter 23 μm, and aspect ratio 60 to 80) manufactured by Yamaguchi Mica Co., Ltd. was used as fine particles (Q) for comparison instead of the fine particles (P), and the content thereof was 1 mass %. Main manufacturing conditions and evaluation results are shown in Table 2.

Comparative Examples 2 and 3

A thermoplastic resin film having a thickness of 75 μm was obtained in the same manner as that in Example 1 except that the content of the fine particles (P) was changed to 1 mass % and 10 mass % as shown in Table 2. Main manufacturing conditions and evaluation results are shown in Table 2.

Comparative Example 4

A thermoplastic resin film having a thickness of 75 μm was obtained in the same manner as that in Example 1 except that crosslinkable acrylic resin particles "TAFTIC (registered trademark) FH-S" manufactured by Toyobo Co., Ltd. (volume average particle diameter 5 μm, and aspect ratio about 1) was used as the fine particles (Q) or comparison instead of the fine particles (P). Main manufacturing conditions and evaluation results are shown in Table 2.

Comparative Examples 5 and 6

A thermoplastic resin film having a thickness of 75 μm was obtained in the same manner as that in Example 1 except that one or both of the pair of cooling rollers were silicone rubber roll. Main manufacturing conditions and evaluation results are shown in Table 3.

(Evaluation Results)

In Examples 1 to 4, the thermoplastic resin composition (C) including the thermoplastic resin (R) and the fine particles (P) having a volume average particle diameter of 0.5 to 15 μm and a refractive index different from that of the thermoplastic resin (R) by 0.02 or more was used.

In Examples 1 to 4, after the above thermoplastic resin composition (C) was melted and extruded from a T-die, the melted product extruded into a film shape was sandwiched between the pair of cooling rollers, which are both metallic rigid rollers or one is a metallic rigid roller and the other is a metallic elastic roller.

In Examples 1 to 4, the thermoplastic resin film including at least one of the film surfaces satisfying the above formulas (1) and (2) was obtained. In Examples 1 to 4, the thermoplastic resin film including the fine particles (P), in which both of the film surfaces had high gloss at an ordinary temperature, had favorable printability, had small internal haze and total haze, and exhibited a favorable matte appearance after the heat treatment was obtained.

On the other hand, in Comparative Example 1 in which the fine particles (Q) having a large volume average particle diameter were used, the obtained thermoplastic resin film had high internal haze and total haze.

In Comparative Example 2 in which the amount of fine particles (P) added was reduced than that of the fine particles (P) in Comparative Example 1 and the value of d·W was less than 10, the gloss of the obtained thermoplastic resin film did not sufficiently decrease after heat treatment, and thus a desired matte appearance could not be achieved.

In Comparative Example 3 in which the amount of fine particles (P) added was increased than that of the fine particles (P) in Comparative Example 1 and the value of d·W was more than 30, the gloss of the obtained thermoplastic resin film was low before the heat treatment, and the printability thereof was somewhat inferior.

In Comparative Example 4 in which the fine particles (Q) having a refractive index slightly differing from that of the thermoplastic resin (R), the obtained thermoplastic resin film could not achieve a sufficient light diffusing effect after the heat treatment, and thus it did not achieve a favorable matte appearance.

In Comparative Examples 5 and 6 in which one or both of the pair of cooling rollers were silicone rubber rollers, the obtained thermoplastic resin film had large surface recesses and projections on both film surfaces. Thus, the obtained thermoplastic resin film exhibited a matte appearance immediately after the film is manufactured, and the printability was poor.

TABLE 1

|  |  | Example 1 | Example 2 | Example 3 | Example 4 |
|---|---|---|---|---|---|
| Fine particles (P) | Refractive index | 1.53 | 1.53 | 1.53 | 1.53 |
|  | Aspect ratio | 30-50 | 10-30 | 30-50 | 30-50 |
|  | Volume average particle diameter (μm) | 5 | 10 | 5 | 5 |
|  | Content (mass %) | 3 | 2 | 3 | 3 |

TABLE 1-continued

|  |  |  | Example 1 | Example 2 | Example 3 | Example 4 |
|---|---|---|---|---|---|---|
| Resin (R) | Composition including acrylic-based multilayer structure polymer (AX-2) | Refractive index | 1.49 | 1.49 | 1.49 | 1.49 |
|  |  | Tg (° C.) | 98 | 98 | 98 | 98 |
|  |  | Content (mass %) | 97 | 98 | 77 | 97 |
|  | Methacrylic-based resin (B) | Refractive index | — | — | 1.49 | — |
|  |  | Tg (° C.) | — | — | 115 | — |
|  |  | Content (mass %) | — | — | 20 | — |
| Tg (° C.) of (R) |  |  | 98 | 98 | 98 | 98 |
| Refractive index difference between (R) and (P) |  |  | 0.04 | 0.04 | 0.04 | 0.04 |
| d · w [—] |  |  | 15 | 20 | 15 | 15 |
| First roller |  |  | Metallic elastic roller | Metallic elastic roller | Metallic elastic roller | Metallic rigid roller |
| Second roller |  |  | Metallic rigid roller | Metallic rigid roller | Metallic rigid roller | Metallic rigid roller |

TABLE 1-continued

|  |  |  | Example 1 | Example 2 | Example 3 | Example 4 |
|---|---|---|---|---|---|---|
| Haze | Total haze (%) |  | 14.8 | 14.4 | 14.4 | 14.6 |
|  | Internal haze (%) |  | 8.8 | 10.0 | 8.6 | 8.8 |
|  | External haze (%) |  | 6.0 | 4.4 | 5.8 | 5.8 |
| Gloss | First roller contacting surface | $G_L$ (%) | 92 | 88 | 92 | 90 |
|  |  | $G_H$ (%) | 61 | 60 | 62 | 58 |
|  |  | $G_L - G_H$ (%) | 31 | 28 | 30 | 32 |
|  | Second roller contacting surface | $G_L$ (%) | 99 | 92 | 99 | 96 |
|  |  | $G_H$ (%) | 60 | 58 | 64 | 56 |
|  |  | $G_L - G_H$ (%) | 39 | 34 | 35 | 40 |
| Printability |  |  | A | A | A | A |

TABLE 2

|  |  |  | Comparative Example 1 | Comparative Example 2 | Comparative Example 3 | Comparative Example 4 |
|---|---|---|---|---|---|---|
| Fine particles (P) or fine particles (Q) | Refractive index |  | 1.53 | 1.53 | 1.53 | 1.50 |
|  | Aspect ratio |  | 60-80 | 30-50 | 30-50 | 1 |
|  | Volume average particle diameter (μm) |  | 23 | 5 | 5 | 5 |
|  | Content (mass %) |  | 1 | 1 | 10 | 3 |
| Resin (R) | Composition including acrylic-based multilayer structure polymer (AX-2) | Refractive index | 1.49 | 1.49 | 1.49 | 1.49 |
|  |  | Tg (° C.) | 98 | 98 | 98 | 98 |
|  |  | Content (mass %) | 99 | 99 | 90 | 97 |
|  | Methacrylic-based resin (B) | Refractive index | — | — | — | — |
|  |  | Tg (° C.) | — | — | — | — |
|  |  | Content (mass %) | — | — | — | — |
| Tg (° C.) of (R) |  |  | 98 | 98 | 98 | 98 |
| Refractive index difference between (R) and (P) or (Q) |  |  | 0.04 | 0.04 | 0.04 | 0.01 |
| d · w [—] |  |  | 23 | 5 | 50 | 15 |
| First roller |  |  | Metallic elastic roller | Metallic elastic roller | Metallic elastic roller | Metallic elastic roller |
| Second roller |  |  | Metallic rigid roller | Metallic rigid roller | Metallic rigid roller | Metallic rigid roller |
| Haze | Total haze (%) |  | 20.3 | 9.9 | 33.3 | 9.1 |
|  | Internal haze (%) |  | 15.4 | 5.1 | 13.5 | 4.7 |
|  | External haze (%) |  | 4.9 | 4.8 | 19.8 | 4.4 |
| Gloss | First roller contacting surface | $G_L$ (%) | 91 | 95 | 55 | 93 |
|  |  | $G_H$ (%) | 61 | 86 | 45 | 84 |
|  |  | $G_L - G_H$ (%) | 30 | 9 | 10 | 9 |
|  | Second roller contacting surface | $G_L$ (%) | 96 | 98 | 53 | 91 |
|  |  | $G_H$ (%) | 65 | 89 | 44 | 82 |
|  |  | $G_L - G_H$ (%) | 31 | 9 | 9 | 9 |
| Printability |  |  | A | A | B | A |

TABLE 3

|  |  |  | Comparative Example 5 | Comparative Example 6 |
|---|---|---|---|---|
| Fine particles (P) | Refractive index |  | 1.53 | 1.53 |
|  | Aspect ratio |  | 30-50 | 30-50 |
|  | Volume average particle diameter (μm) |  | 5 | 5 |
|  | Content (mass %) |  | 3 | 3 |
| Resin (R) | Composition including acrylic-based multilayer structure polymer (AX-2) | Refractive index | 1.49 | 1.49 |
|  |  | Tg (° C.) | 98 | 98 |
|  |  | Content (mass %) | 97 | 97 |
|  | Methacrylic-based resin (B) | Refractive index | — | — |
|  |  | Tg (° C.) | — | — |
|  |  | Content (mass %) | — | — |

TABLE 3-continued

|  |  | Comparative Example 5 | Comparative Example 6 |
|---|---|---|---|
| Tg (° C.) of (R) |  | 98 | 98 |
| Refractive index difference between (R) and (P) |  | 0.04 | 0.04 |
| d · w [—] |  | 15 | 15 |
| First roller |  | Silicone rubber roller | Silicone rubber roller |
| Second roller |  | Metallic elastic roller | Silicone rubber roller |
| Haze | Total haze (%) | 68.4 | 55.1 |
|  | Internal haze (%) | 8.7 | 8.7 |
|  | External haze (%) | 59.7 | 46.4 |
| Gloss | First roller contacting surface $G_L$ (%) | 11 | 10 |
|  | $G_H$ (%) | 26 | 24 |
|  | $G_L - G_H$ (%) | −15 | −14 |
|  | Second roller contacting surface $G_L$ (%) | 27 | 11 |
|  | $G_H$ (%) | 25 | 24 |
|  | $G_L - G_H$ (%) | 2 | −13 |
| Printability |  | C | C |

The present invention is not limited to the above-described embodiments and examples, and can be appropriately modified in design without departing from the scope of the present invention.

The present application is based upon and claims the benefit of priority from Japanese Patent Application No. 2016-025751, filed on Feb. 15, 2016, the entire contents of which are hereby incorporated by reference.

REFERENCE SIGNS LIST

1 FILM MANUFACTURING APPARATUS
110 EXTRUSION MOLDING MEANS
111 RAW MATERIAL CHARGING UNIT
112 SCREW UNIT
113 T-DIE
113A DISCHARGE PORT
120 COOLING ROLLER UNIT
121 FIRST COOLING ROLLER
122 SECOND COOLING ROLLER
123 THIRD COOLING ROLLER
124 FOURTH COOLING ROLLER
210 RESIN FILM
210M RESIN COMPOSITION
R1 FIRST MANUFACTURING ROOM
R2 SECOND MANUFACTURING ROOM

The invention claimed is:

1. A thermoplastic resin film composed of a thermoplastic resin composition (C) comprising:
a thermoplastic resin (R); and
fine particles (P) having a volume average particle diameter of from 0.5 to 15 μm and a refractive index different from a refractive index of the thermoplastic resin (R) by 0.02 or more,
wherein:
the fine particles (P) are inorganic particles; and
at least one of thermoplastic resin film surfaces satisfies formulas (1) and (2):

$$G_L \geq 60 \qquad (1), \text{and}$$

$$G_L - 35 \leq G_H \leq G_L - 10 \qquad (2)$$

wherein $G_L$ is 60° gloss (%) at 20° C., and $G_H$ is 60° gloss (%) when the thermoplastic resin film is heated at a temperature 10° C. higher than a glass transition temperature of the thermoplastic resin composition (C) for 30 minutes, then cooled to 20° C.

2. The thermoplastic resin film according to claim 1, wherein the thermoplastic resin film further satisfies formula (3-1):

$$10/d \leq W \leq 30/d \qquad (3-1)$$

wherein d is a volume average particle diameter (μm) of the fine particles (P), and W is a content (mass %) of the fine particles (P) in the thermoplastic resin film.

3. The thermoplastic resin film according to claim 1, wherein an external haze of the thermoplastic resin film is lower than an internal haze of the thermoplastic resin film.

4. The thermoplastic resin film according to claim 1, wherein the thermoplastic resin (R) comprises:
acrylic-based multilayer structure polymer particles (A), wherein:
at least one inner layer of the thermoplastic resin is a crosslinked elastic polymer layer with a main component monomer unit being an alkyl acrylate ester monomer unit having an alkyl group carbon number of 1 to 8 and/or a conjugated diene-based monomer unit; and
an outermost layer of the thermoplastic resin is a thermoplastic polymer layer with a main component monomer unit being an alkyl methacrylate ester monomer unit having an alkyl group carbon number of from 1 to 8.

5. The thermoplastic resin film according to claim 4, wherein the acrylic-based multilayer structure polymer particles (A) comprise:
three-layer structure polymer particles (AX) that comprise, from its center, first to third layers, wherein:
the first layer consists of a crosslinked polymer layer comprising from 30 to 98.99 mass % of methyl methacrylate units, from 1 to 70 mass % of alkyl acrylate ester units having an alkyl group carbon number of from 1 to 8, and from 0.01 to 2 mass % of polyfunctional monomer units;
the second layer consists of a cross linked elastic polymer layer comprising from 70 to 99.9 mass % of alkyl acrylate ester units having an alkyl group carbon number of from 1 to 8, from 0 to 30 mass % of methyl methacrylate units, and from 0.1 to 5 mass % of polyfunctional monomer units; and
the third layer consists of a hard thermoplastic polymer layer comprising from 80 to 99 mass % of methyl methacrylate units and from 1 to 20 mass % of alkyl acrylate ester units having an alkyl group carbon number of from 1 to 8.

6. The thermoplastic resin film according to claim 4, wherein the acrylic-based multilayer structure polymer particles (A) have a particle diameter of from 0.05 to 0.20 μm.

7. The thermoplastic resin film according to claim 4, wherein the thermoplastic resin (R) further comprises a methacrylic-based resin (B) having 80 mass % or more of methyl methacrylate units and having an intrinsic viscosity of from 0.3 to 1.0 dl/g.

8. A printed resin film, comprising:
the thermoplastic resin film according to claim 4; and
a printed film surface.

9. A matte resin film obtained by heating the thermoplastic resin film according to claim 4.

10. A decorating film, comprising:
the thermoplastic resin film according to claim 4.

11. A film for building materials, comprising:
the thermoplastic resin film according to claim 4.

12. A laminated film, comprising:
the thermoplastic resin film according to claim 4.

13. A laminated body, comprising:
the thermoplastic resin film according to claim 4 laminated on a substrate.

14. A method of manufacturing the thermoplastic resin film according to claim 4, the method comprising:
melting and extruding the thermoplastic resin composition (C) from a T-die into a film shape; and
sandwiching a melted product extruded into the film shape between a pair of cooling rollers, which are both metallic rigid rollers or one is a metallic rigid roller and the other is a metallic elastic roller.

15. The method according to claim 14, which satisfies formula (4):

$$10 \leq |TgC - T2| \leq 40 \quad (4),$$ and wherein T1 is a surface temperature of one of the cooling rollers,
T2 is a surface temperature of the other one of the cooling rollers (where T2≥T1), and
TgC is a glass transition temperature of the thermoplastic resin composition (C).

16. A method of manufacturing a matte resin film, the method comprising:
applying a heat treatment to the thermoplastic resin film according to claim 4.

17. A method of manufacturing a matte resin film, the method comprising:
printing at least one film surface of the thermoplastic resin film according to claim 4; and
applying a heat treatment to the thermoplastic resin film.

* * * * *